July 12, 1960  M. W. HAZELTON ET AL  2,944,468
SHAPER
Filed Sept. 20, 1955  16 Sheets-Sheet 1

INVENTORS
MERRILL W. HAZELTON,
RICHARD E. GRIESHEIMER &
BY JAMES M. ALLNUTT
ATTORNEYS

INVENTORS
MERRILL W. HAZELTON,
RICHARD E. GRIESHEIMER &
JAMES M. ALLNUTT
BY Hudson, Boughton,
Williams, Davis & Hoffmann
ATTORNEYS July 12, 1960 M. W. HAZELTON ET AL 2,944,468
SHAPER
Filed Sept. 20, 1955 16 Sheets-Sheet 5

INVENTORS
MERRILL W. HAZELTON,
RICHARD E. GRIESHEIMER &
BY JAMES M. ALLNUTT
ATTORNEYS

July 12, 1960 M. W. HAZELTON ET AL 2,944,468
SHAPER
Filed Sept. 20, 1955 16 Sheets-Sheet 7

INVENTORS
MERRILL W. HAZELTON,
RICHARD E. GRIESHEIMER &
BY JAMES M. ALLNUTT
ATTORNEYS

July 12, 1960 M. W. HAZELTON ET AL 2,944,468
SHAPER
Filed Sept. 20, 1955 16 Sheets-Sheet 9

INVENTORS
MERRILL W. HAZELTON,
RICHARD E. GRIESHEIMER &
BY JAMES M. ALLNUTT

ATTORNEYS

July 12, 1960 M. W. HAZELTON ET AL 2,944,468
SHAPER
Filed Sept. 20, 1955 16 Sheets-Sheet 10

INVENTORS
MERRILL W. HAZELTON
RICHARD E. GRIESHEIMER &
BY JAMES M. ALLNUTT

ATTORNEYS

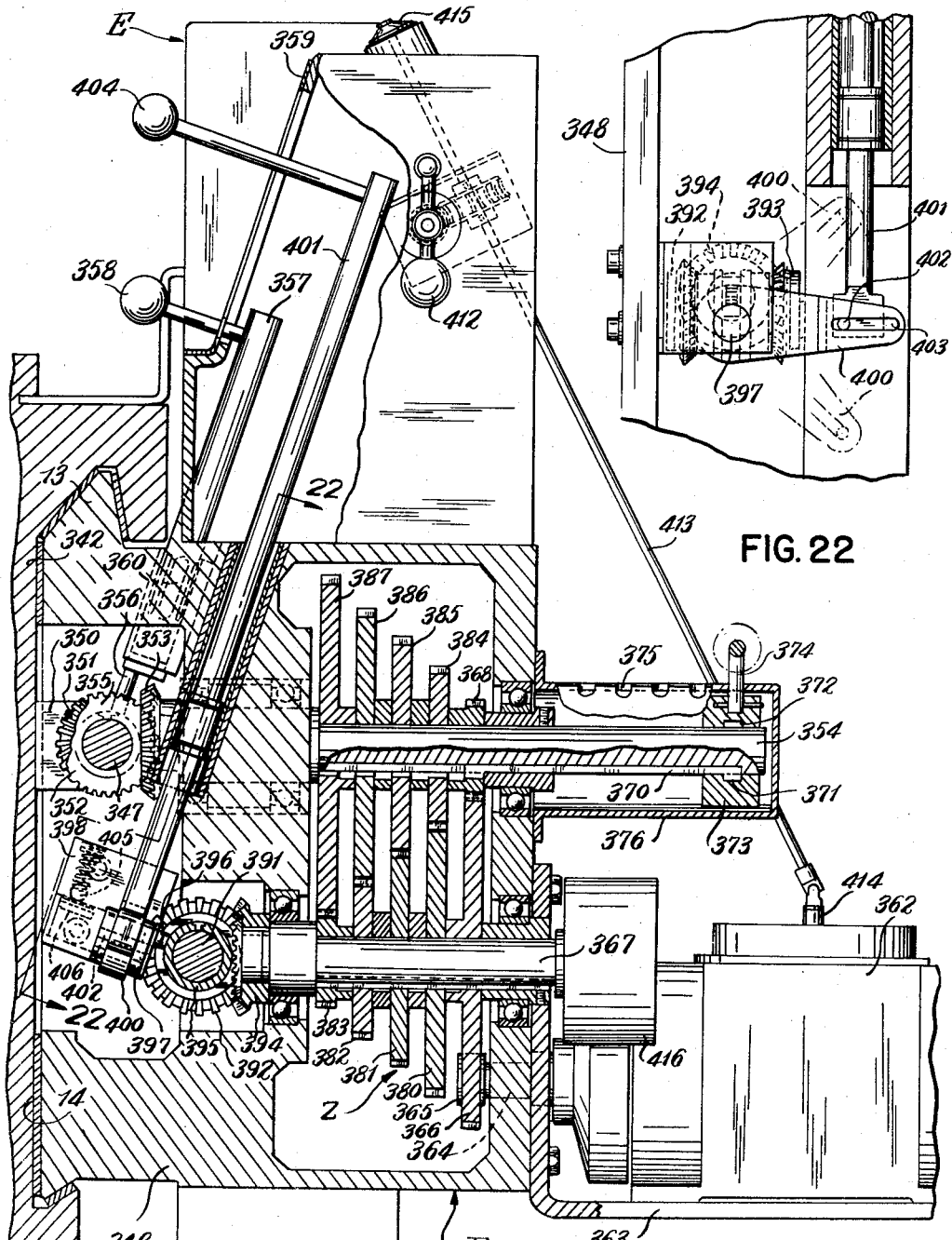

July 12, 1960   M. W. HAZELTON ET AL   2,944,468
SHAPER
Filed Sept. 20, 1955   16 Sheets-Sheet 14

INVENTORS
MERRILL W. HAZELTON,
RICHARD E. GRIESHEIMER &
BY JAMES M. ALLNUTT
Hudson, Boughton,
Williams, David Hoffmann
ATTORNEYS

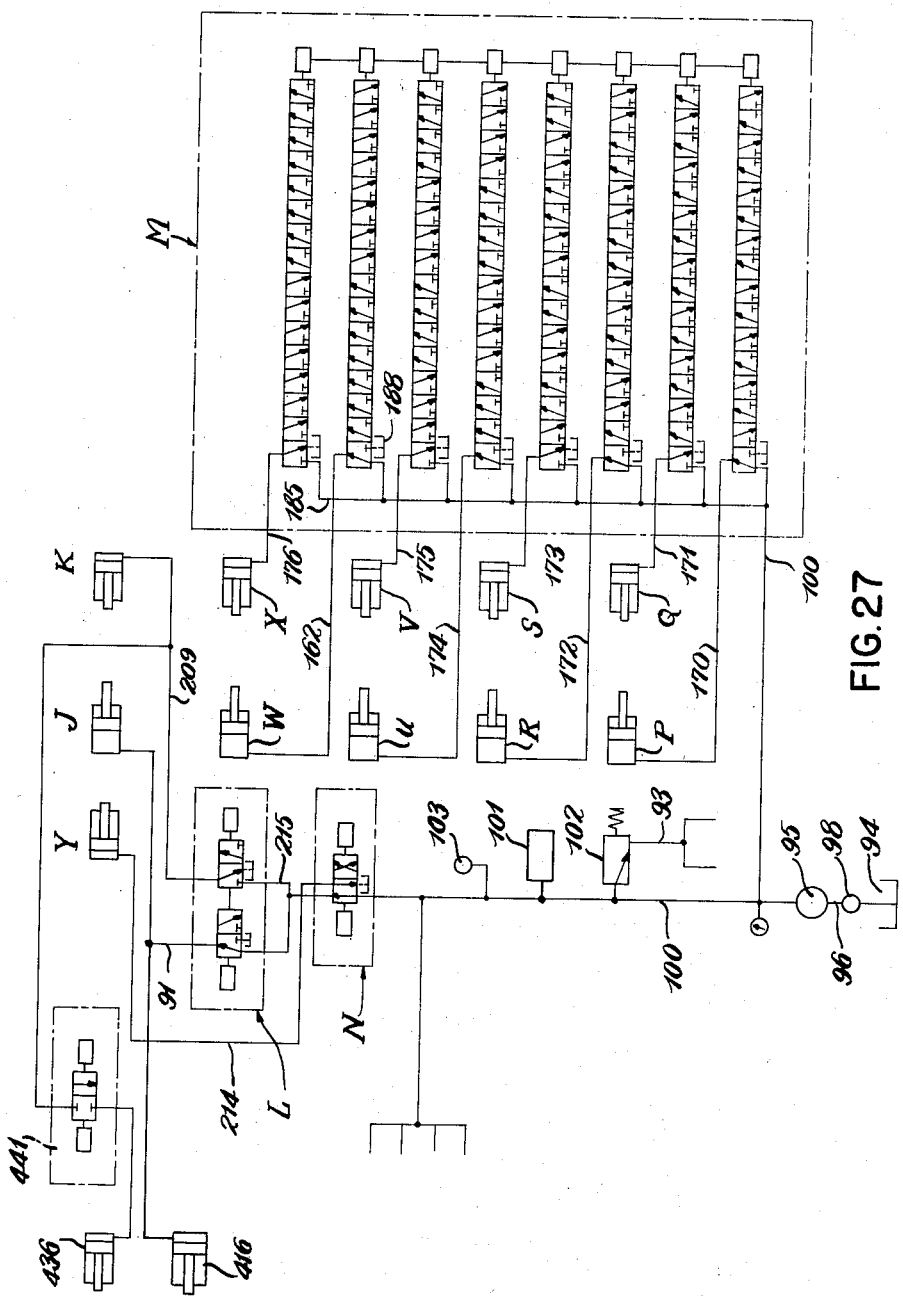

July 12, 1960  M. W. HAZELTON ET AL  2,944,468
SHAPER

Filed Sept. 20, 1955  16 Sheets-Sheet 16

INVENTORS
MERRILL W. HAZELTON,
RICHARD E. GRIESHEIMER &
BY JAMES M. ALLNUTT

ATTORNEYS

United States Patent Office 2,944,468
Patented July 12, 1960

2,944,468

SHAPER

Merrill W. Hazelton, Richard E. Griesheimer, and James M. Allnutt, Cincinnati, Ohio, assignors to The Cincinnati Shaper Company, Cincinnati, Ohio, a corporation of Ohio Filed Sept. 20, 1955, Ser. No. 535,428

24 Claims. (Cl. 90—48)

The present invention relates to machine tools and, more particularly, to machine tools of the type commonly referred to as "shapers."

One of the principal objects of the present invention is the provision of a novel and improved, high speed machine tool of the shaper type having a compact, simple design and comprising a reciprocable tool ram, and means for reciprocating the ram through its work stroke at a selected one of a plurality of different speeds, which speeds are constant or substantially so throughout the working stroke and for returning it through its idler stroke at a high speed, which high speed is also preferably constant or substantially so and may be the same as the highest work stroke speed whereby greater production is obtained, other conditions being equal, than would be possible if the ram was not moved at a constant speed throughout its work stroke.

Another object of the invention is the provision of a novel and improved, high speed machine tool of the shaper type having a reciprocable tool ram, and means for reciprocating the ram of the character mentioned and otherwise being so constructed and arranged that, within the limitations of the construction, the length of the stroke of the ram can be adjusted as desired and positioned with respect to the column at any desired location.

Another of the principal objects of the invention is the provision of a novel and improved, high speed machine tool of the character referred to having the controls for adjusting the length of the stroke of the ram and its location with respect to the column carried by a stationary part of the machine, thereby facilitating the making of various desired adjustments even though the machine is in operation.

Another of the principal objects of the invention is the provision of a novel and improved, high speed machine tool of the shaper type having a light-weight ram so constructed and supported as to provide maximum rigidity and minimum deflection. To this end, the ram is preferably triangular in transverse cross-section, made of steel and enclosed in the top of the column by means providing large bearing surfaces, easily lubricated and, therefore, relatively free from wear.

Another of the principal objects of the invention is the provision of a novel and improved, high speed machine tool of the shaper type having a reciprocable ram, and means for reciprocating the ram, preferably of the character previously referred to, in combination with means for storing the energy of the ram as it is stopped and reversed at the end of its stroke and for returning the stored energy to the ram to start its movement in the reverse direction.

Another of the principal objects of the invention is the provision of a novel and improved, high speed machine tool of the shaper type having a tool ram comprising means for attaching the tool thereto without the imposition of a swivel or tool slide.

Another of the principal objects of the invention is the provision of a novel and improved, high speed machine tool of the shaper type, preferably of the character previously referred to, having screw means for reciprocating the ram and a variable speed transmission for driving the screw at different speeds, which transmission is so constructed and arranged that the gears are always in mesh, etc.

A further principal object of the invention is the provision of a high speed machine tool of the shaper type, preferably of the character previously referred to, comprising a rail and table so constructed of steel as to have minimum deflection and provided with reversible, power actuated, vertical, horizontal and angular feeds and rapid traverse movement.

The present invention resides in certain constructions and combinations and arrangements of parts and further objects and advantages thereof will be apparent to those skilled in the art to which it relates from the following description of the preferred embodiment described with reference to the accompanying drawings forming a part of this specification, in which similar reference characters designate corresponding parts throughout the several views, and in which:

Fig. 21 is a transverse fragmentary sectional view, with portions broken away and in elevation, through the rail showing the drive therefor and for the table;

Fig. 22 is a fragmentary sectional view approximately on the line 22—22 of Fig. 21;

Fig. 27 is a schematic diagram showing the hydraulic parts of the machine; and

Figure 1:
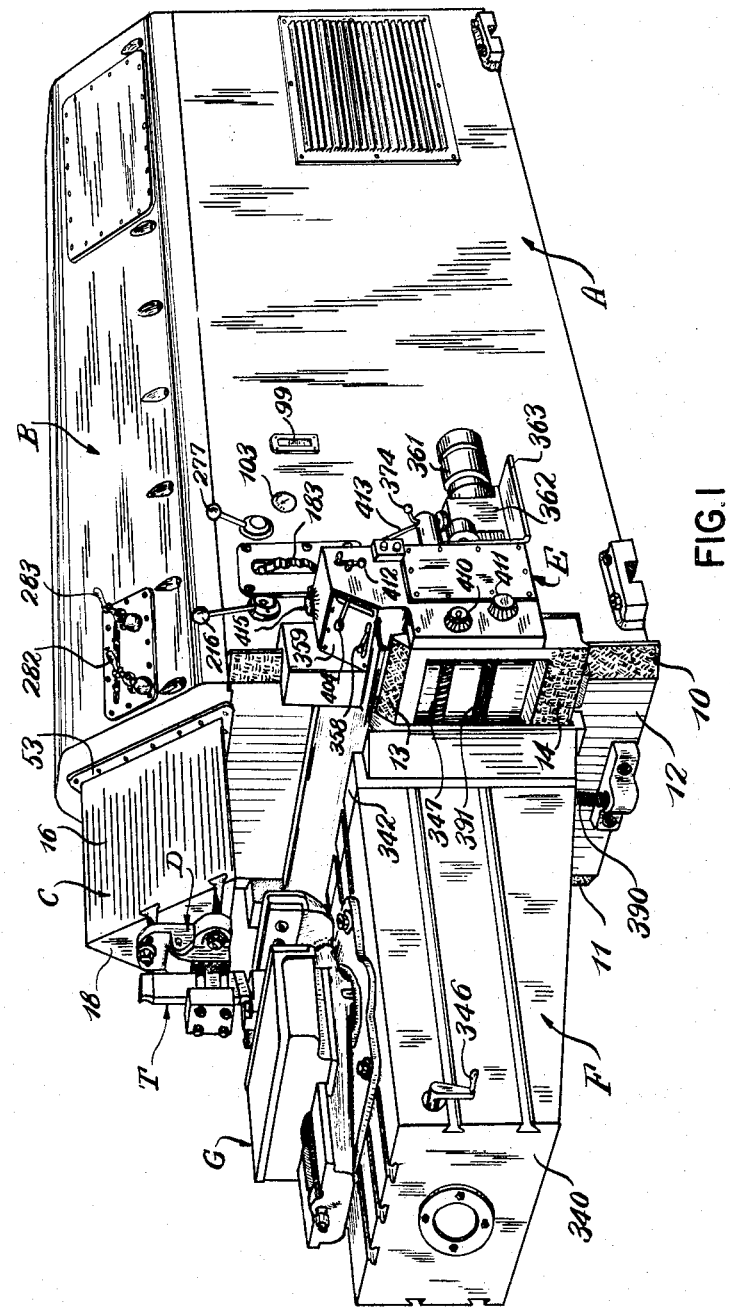
Fig. 1 is a perspective view of a shaper embodying the present invention.

Referring to the drawings, the machine tool or shaper shown comprises a fabricated steel frame including a generally rectangular, box-like, hollow column A provided with a cap B detachably fixed onto the top of the column and a tool carrier or ram C slidably supported in the front portion of the frame between the top side of the column A and the cap B for reciprocable, linear movement in a generally horizontal path. The ram C is triangular in cross-sectional shape and is adapted to carry a conventional tool T detachably connected to a clapper box-type tool head D adjustably fixed to the front end of the ram. The column A is provided with a plurality of vertical ways 10, 11 on the one side or face 12, hereinafter referred to as the front face of the column, upon which ways a rail E is supported for vertical movement. The rail E is provided with suitable horizontal ways 13, 14 upon which a work table F is supported underneath the path of movement of the ram C for movement transversely of the front face of the column.

A vise or work holder G of conventional construction is shown in Fig. 1 detachably fixed to the top of the table F for holding work to be operated upon by the tool T.

The column A is box-like in construction, as previously stated, and has a plurality of partitions or webs therein which in addition to forming means for stiffening the column, divide the interior into various compartments for housing different operating parts of the machine. The column A and the cap B are both preferably made of steel and so constructed and arranged as to be as light in weight as possible consistent with other requirements, such as rigidity and freedom from deflection under the loads to which they are subjected during operation of the machine.

The ram C is preferably constructed and supported in the frame of the machine in such a manner that it can be made as light as possible consistent with other requirements so as to facilitate its reciprocation at high speed, especially on the idler or return stroke, with minimum power. In addition to increased production, other conditions remaining the same, a light weight ram produces less wear, etc., on the various parts and reduces the amount of maintenance required.

The ram C, as shown, is hollow and in cross-section, is generally triangular in shape, being formed of three rectangular steel plates 15, 16, 17 welded together at their adjoining corners and reinforced by a front plate 18 welded to the front ends of the plates 15, 16, 17; a rear plate or web 20 located within the ram and welded to the plates 15, 16, 17 a short distance inwardly of their rear ends; web members 21, 22 intermediate the ends of the ram, the latter of which is only about one-half the height of the ram; and internal longitudinal webs or members 23, 24, 25 located adjacent to the corners of the ram and extending between the front and rear end plates 18, 20. The internal webs 21, 22, 23 are welded to each other, to the end members 18, 20 and/or to the plates 15, 16, 17, as the case may be.

The ram C is slidably supported on the top side 29 of the column A by the cap B between a pair of bottom ways in the form of detachable bearing strips 30, 31, preferably formed of Formica or like material, fixed in suitable grooves formed in the top side of the column A and similar pairs of bearing ways 32, 33 and 34, 35 on the under side or sides of the cap B. The ways project slightly beyond the grooves in which they are positioned and the bottom ways 30, 31 are engaged by the bottom plate 15 of the ram C, the ram being so positioned that, referring to its triangular, cross-sectional shape, the bottom is down and the apex up. The pairs of ways 32, 33 and 34, 35 engage the right and left-hand side plates 16, 17, respectively, of the ram C adjacent to the upper and lower edges thereof and are located in grooves formed in longitudinally extending pairs of members 37, 38 and 40, 41 to which they are fixedly secured. The members 37, 38 and 40, 41 are, in turn, fixed to the under or inner sides of the forward angular members 42 to 46 of a series of angular members 42 to 49 spaced lengthwise of and forming parts of the cap B. The column A is relatively long and the ram ways 30–35 extend back from the front wall or face 12 of the column only to about the mid-point of the column as does the top side 29 of the column. The rear portion of the top side 29 of the column is open for purpose that will hereinafter appear.

The angular frame or rib members 42 to 49 are quite heavy steel members and the opposite lower ends thereof are detachably fixed, as by screws 50, to the top wall 29 of the column A outwardly of the ways 30, 31 and adjacent to the outer edges thereof. The angular frame members 42 to 49 of the cap B are enclosed by a metal cover 51 to which they are welded to form a light weight, unitarily constructed cap B. A wiper or seal fixed to the front end of the cap B and to the adjacent part of the column A by a metal member 53 prevents the entrance of dirt, etc., into the interior of the cap B as the ram is reciprocated.

The ram is reciprocated through its working and idle strokes by a multiple thread drive screw 60 having threaded engagement with an elongated nut 61 provided with a flange 62 by which it is bolted to the rear end plate 20 of the ram C. The screw 60 is rotatably supported in the upper right-hand part of the column A, to the rear of the ram C as viewed in Fig. 2, and projects forwardly into the interior of the ram. The intermediate webs or plates 21, 22 in the interior of the ram C are provided with suitable apertures through which the forward end of the drive screw 60 projects as the ram C is reciprocated. The drive screw 60 is adapted to be rotated in opposite directions to reciprocate the ram C by an electric motor 63 located in the lower rear part of the column A beneath an intermediate horizontal partition 64 in the column, which partition extends from an intermediate vertical partition 65 to the rear wall 66 of the column. The motor 63 is connected to the drive screw 60 through a variable speed and direction change transmission H to which it is connected by a flexible drive comprising driving and driven pulleys 67, 68 connected to the motor 63 and the input shaft 70 of the transmission H, respectively, and to each other by a belt 71. The belt drive as well as some of the other operating parts of the machine which are located outside of the rear wall 66 of the column are enclosed by a guard or enclosure 72 detachably connected to the column and the rear parts of the cap B.

The transmission H is connected to the drive screw 60 through forward and reverse drive gears 73, 74 rotatably supported coaxially with the drive screw 60 and adapted to be alternatively, selectively connected to and disconnected from the drive screw 60 by forward and reverse pressure fluid actuated, friction disk-type drive clutches J and K. The rear portion of the drive screw 60 is unthreaded and is supported by suitable front and rear cone-type antifriction bearings 75, 76 designed to withstand the loads imposed thereon including the end thrust produced incident to the reciprocation of the ram C. The bearings 75, 76 are suitably fixed to the screw 60 and to two flanged sleeve members 77, 78 detachably bolted to the front and rear faces of relatively heavy bracket or frame members 80, 81, respectively, which frame members are welded to the top of the column A, project upwardly into the cap B, and have their upper ends connected by an integral boss 82.

The forward drive gear 73 for rotating the drive screw 60 in the forward direction, that is, in a direction to move the ram C towards the left to effect the work stroke, has an elongated hub rotatably supported in the frame member 80 concentric with the screw 60 by a bushing 83. Alternate disks of the fluid pressure actuated, friction disk-type forward drive clutch J are keyed or splined to the hub of the gear 73 and to a splined section 86 of the screw 60. The clutch J which is adapted to be selectively, operatively connected to and disconnected from the forward drive gear 73, comprises a spool-like piston 87 concentric with the screw 60, one head of which is splined to the hub of the gear 73 and is in engagement with the left-hand disk of the clutch, as viewed in Fig. 8. The other or left-hand head of the piston 87 is slidably supported between the left-hand end of the bushing 83 and an internal bushing 88 having an external flange, which bushing is located within a cup-shaped sleeve member 90 having an external flange clamped between an internal shoulder on the front bearing support sleeve or member 77 and the face of the frame member 80 adjacent thereto. The right-hand face of the internal flange on the member 90 forms the cylinder head for the piston 87. Pressure fluid, preferably oil under pressure, is supplied to and exhausted or permitted to drain from the space intermediate the head of the piston 87 and the adjacent end of the member 90 by a port opening therein and connected by conduit means 91 to a reversing valve L. The interior of the bushing 83 to the right or non-pressure side of the head of the piston 87 is connected by conduit means 93 to the cooling oil circuit which is supplied from a relief valve, hereinafter mentioned. The ends of the clutch plates of the clutch J are relieved slightly allowing this oil to flow thereover to the opposite or right-hand end of the clutch where it drains through suitable holes 89 in the gear 73 to the interior of the column A above the horizontal partition 64, the lower portion of which forms an oil sump and reservoir 94 is filled with oil to a predetermined level indicated by a sight gauge 99 on the operator's side of the column.

Pressure fluid is supplied for operating the clutch J and the other pressure fluid operated devices hereinafter referred to and for lubricating the various parts of the machine including the ways for guiding the ram C by a pump 95 driven from the input shaft 70 of the transmission H. The intake for the pump 95 is connected by conduit means 96 to the oil reservoir 94 through a filter 98 and the supply or pressure side of the pump is connected, as by conduit means 100, with an accumulator 101, a relief valve 102, a pressure gauge 103 located at the operator's or near side of the machine, as viewed in Fig. 1, adjacent to the front end of the column, a speed selector control valve M, and a ram operation control valve N.

Figure 28:
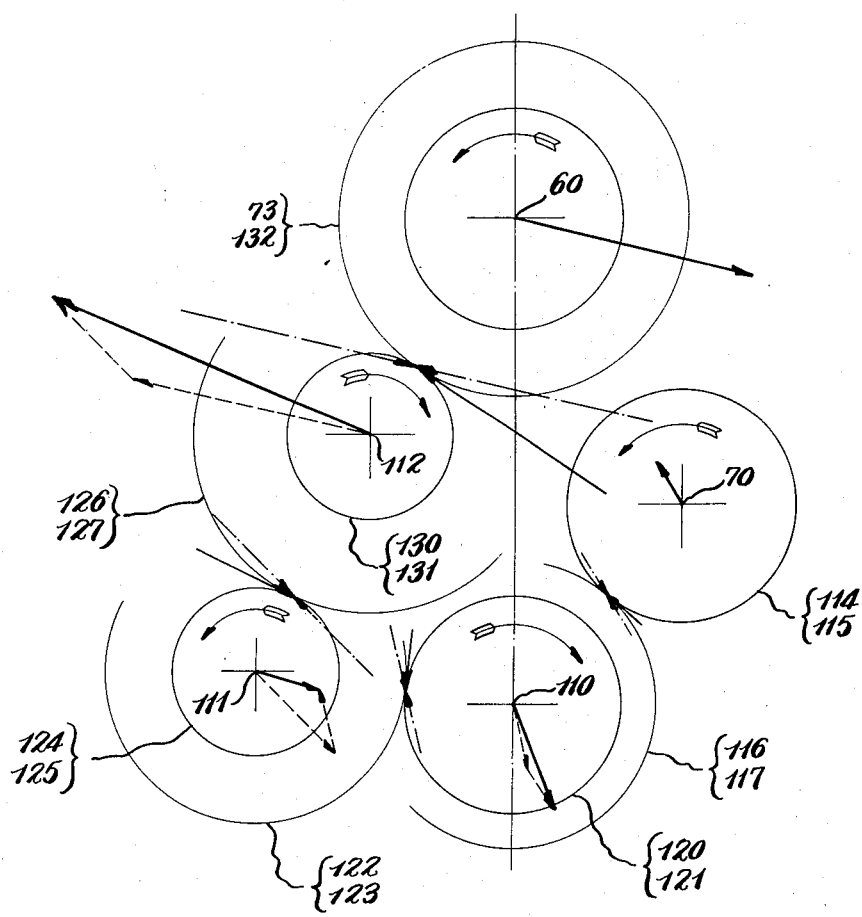
Fig. 28 is a diagram showing the gear and shaft loads.

The speed and direction change transmission H through which the forward drive gear 73 and in turn the drive screw 60 are driven by the motor 63 at a selected one of a plurality of speeds to move the ram at different cutting speeds comprises, in addition to the input shaft 70, intermediate shafts 110, 111 and an output shaft 112, all suitably supported in anti-friction bearings in the frame members 80, 81. The input shaft 70, in addition to a reverse driving gear 113 keyed thereto at the right-hand or rear side of the frame member 81, has two gears 114, 115 rotatably supported thereon, and adapted to be selectively connected thereto by fluid pressure actuated, friction disk-type clutches P, Q. The gears 114, 115 are continuously in mesh with gears 116, 117, respectively, fixedly keyed to the first intermediate shaft 110, which shaft also carries gears 120, 121 rotatable thereon but adapted to be selectively connected to the shaft 110 by fluid pressure actuated, friction disk-type clutches R, S. The gears 120, 121 are continuously in mesh with gears 122, 123, respectively, fixedly keyed to the second intermediate shaft 111 which also carries two additional gears 124, 125 rotatable thereon and adapted to be selectively connected to the shaft 111 by fluid pressure actuated, friction disk-type clutches U, V. The gears 124, 125 are continuously in mesh with gears 126, 127, respectively, fixedly keyed to the output shaft 112, which shaft also carries two additional gears 130, 131 rotatably supported thereon and adapted to be selectively connected thereto by fluid pressure actuated clutches W, X, respectively. The gears 130, 131 are continuously in mesh with the forward drive gear 73 and with a gear 132 formed on the end of a sleeve 133 rotatably supported by a suitable bushing on the splined section 86 of the screw 60. The other or forward end of the sleeve 133 is integral with the forward drive gear 73. The construction is such that the forward drive gear 73 can be driven either by the gear 130 or the gear 131 depending upon which of the pressure fluid activated speed selection clutches of the speed change transmission H are actuated or engaged. The sleeve 133 and the output shaft 112 are provided with center bearings supported in a web or bracket 135 fixed to the column A for the purpose of reducing shaft deflection. The sizes of the various gears and the arrangement of the shafts 70, 110, 111, 112 are such, see Fig. 28, that the gear loads tend to cancel one another.

Figure 8:
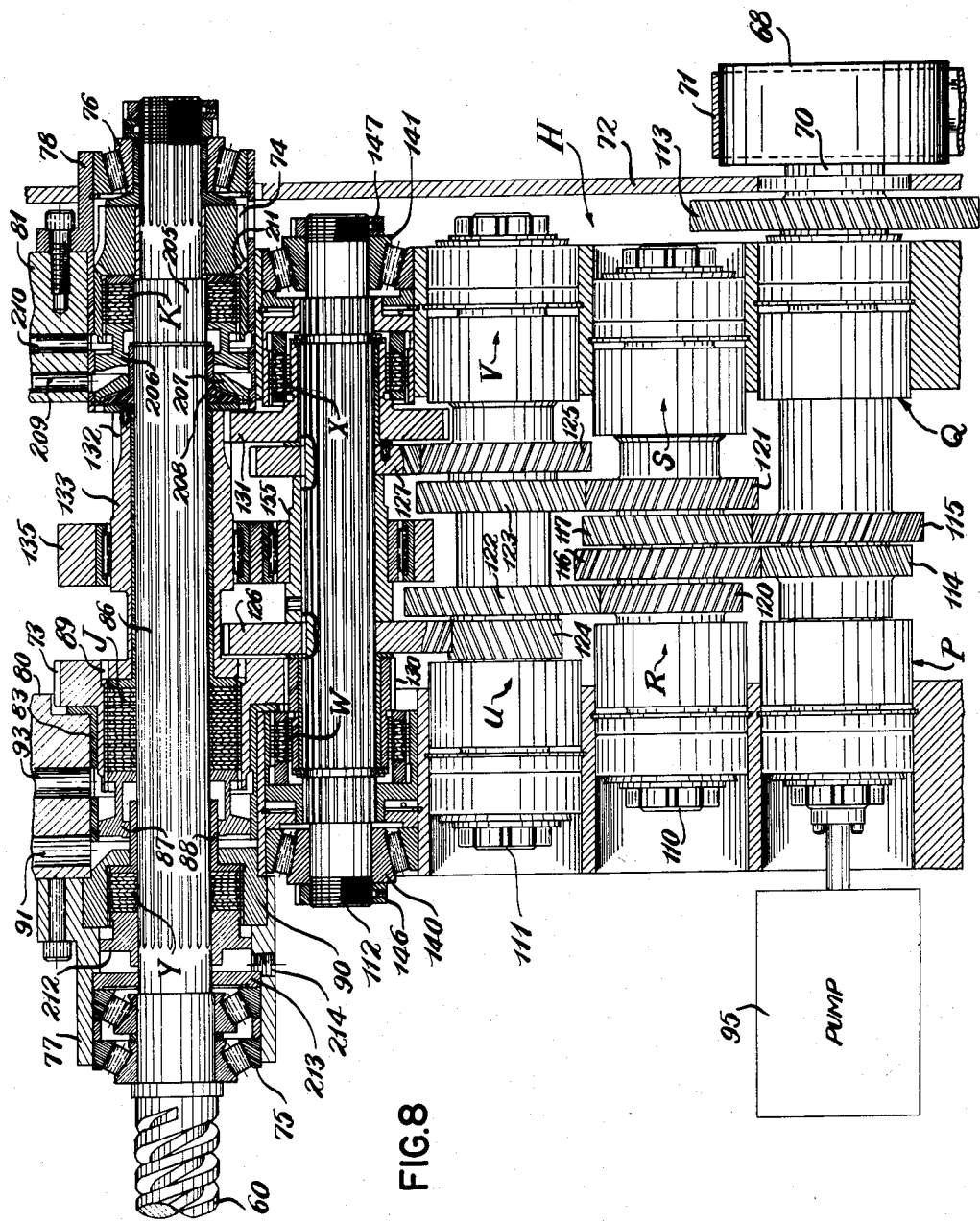
Fig. 8 is a developed view of the speed and direction change transmission shown in Fig. 2.
Figure 9:
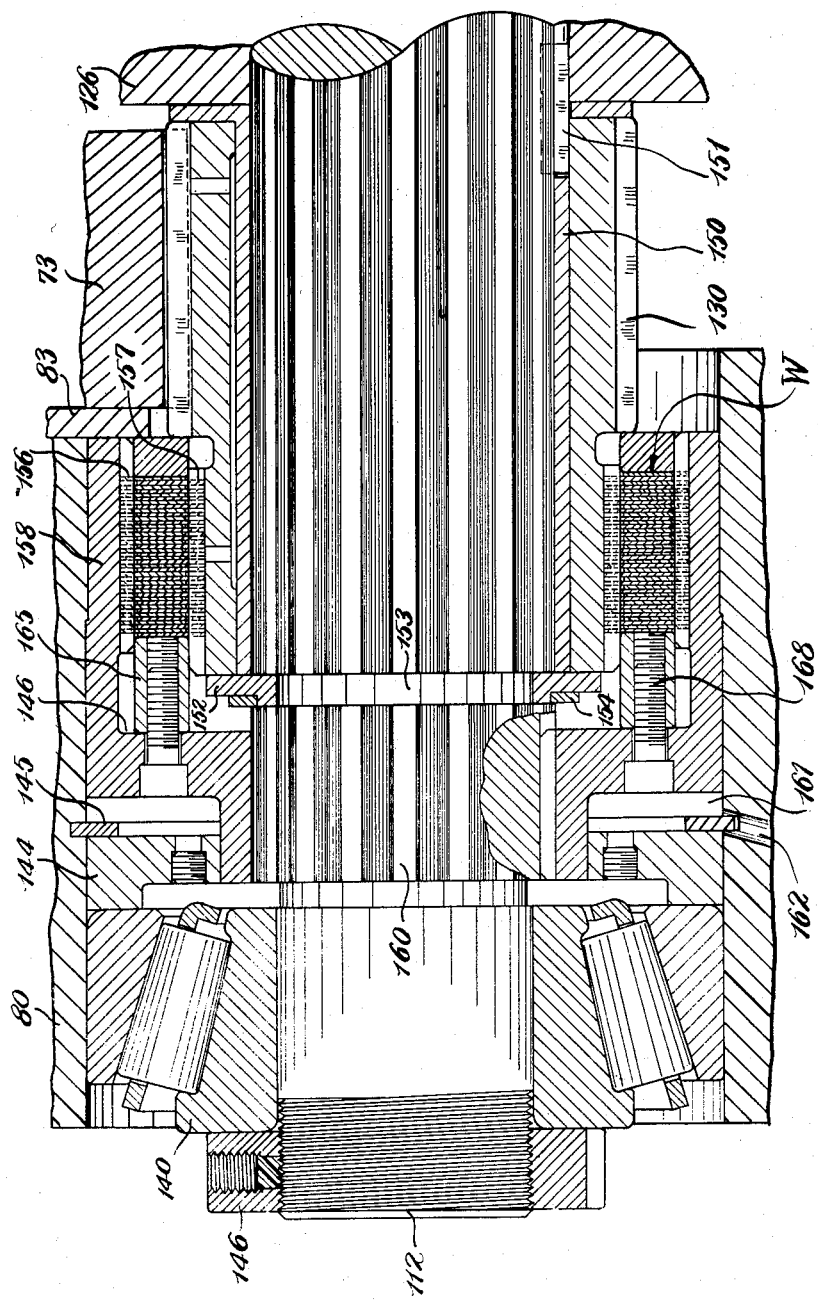
Fig. 9 is an enlarged view of a portion of Fig. 8.

The speed selection clutches P, Q, R, S, U, V, W and X are all controlled from the speed selection control valve M and are all similar in construction and manner of operation and only the clutch W and the manner of supporting the shaft 112 in the frame members 80, 81 will be described in detail. Referring particularly to Figs. 8 and 9, opposite front and rear ends of the shaft 112 are rotatably supported by antifriction roller-type bearings 140, 141 located in suitably aligned apertures in the frame members 80, 81, respectively. A flanged washer-like cylinder head member 144 interposed between the external race of the bearing 140 and a snap ring 145 located in an internal groove in the frame member 80 limits movement of the bearing 140 and shaft 112 in one direction and a similar construction at the other or rear end of the shaft 112 limits movement in the opposite direction. A nut 146 threaded into the front end of the shaft 112 and a similar nut 147 on the rear end of the shaft provide means for adjusting the shaft 112 axially and for preloading the bearings 140, 141.

The speed selection gear 130 is rotatably supported on a flanged bushing 150 keyed, as by a key 151, to the shaft 112. Movement of the bushing 150 towards the left, as viewed in Fig. 9 is limited by an annular abutment member 152 retained in a groove 153 in the shaft 112 by a snap-ring 154. Movement in the opposite direction is limited by the gear 126, which, as previously stated, is splined to the shaft 112. The opposite side of the gear 126 from the gear 130 abuts against a spacer member 155 surrounding the shaft 112 and forming a part of the center bearing support therefor. The opposite end of the spacer member 155 abuts the left-hand side of the gear 127, as viewed in Fig. 8, and the opposite side of the gear abuts a radial flange on a bushing, similar to the bushing 150, to which it is pinned and which supports the gear 131 on the shaft 112. The bushing which carries the gear 131 is held against movement to the right along the shaft 112 in a manner similar to that in which the bushing 150 is held against movement towards the left on the shaft 112.

As previously mentioned, the gear 130 is adapted to be selectively connected to and released from the shaft 112 by the pressure fluid operated friction disk type clutch W. Alternate driving and driven disks 156, 157 of the clutch W are slidably keyed to the driving element 158 of the clutch and to the hub of the gear 130, respectively. The driving element 158 of the clutch W is slidably keyed to a reduced splined portion 160 of the shaft 112, slidably engages the bore in the frame member 80 within which it is positioned and forms the pressure fluid actuated piston member for engaging clutch W. The left-hand end of the member 158, as viewed in Fig. 9, is provided with an annular flange of reduced diameter which slidably engages within the inner diameter of the cylinder head member 144. The construction provides a fluid pressure receiving space or chamber 161 intermediate the cylinder head member 144 and the piston member 158 into which fluid under pressure, preferably oil, is selectively admitted and exhausted or permitted to drain by the speed selector control valve M through suitable conduit means 162 including bores in the frame member 80. In the particular embodiment illustrated, an annular abutment or spacer member 165 is interposed between a should 166 on the piston member 158 and the driven clutch disk adjacent thereto. The annular abutment member 165 is fixedly secured to the member 158 by screws 168. It is believed that the operation of the clutch W will be apparent from the foregoing description. Suffice to say, that upon the application of pressure fluid to the cylinder or chamber 161, the combination piston and driving member 158 of the clutch is moved towards the right, as viewed in the drawings, to compress the clutch disks 156, 157 and operatively connect the gear 130 to the shaft 112.

As previously mentioned, the clutches P, Q, R, S, U, V, and X are constructed and operate in a manner similar to the clutch W and they are connected to the speed selector control valve M in a similar manner by suitable conduit means 170 to 176, respectively.

Figure 2:
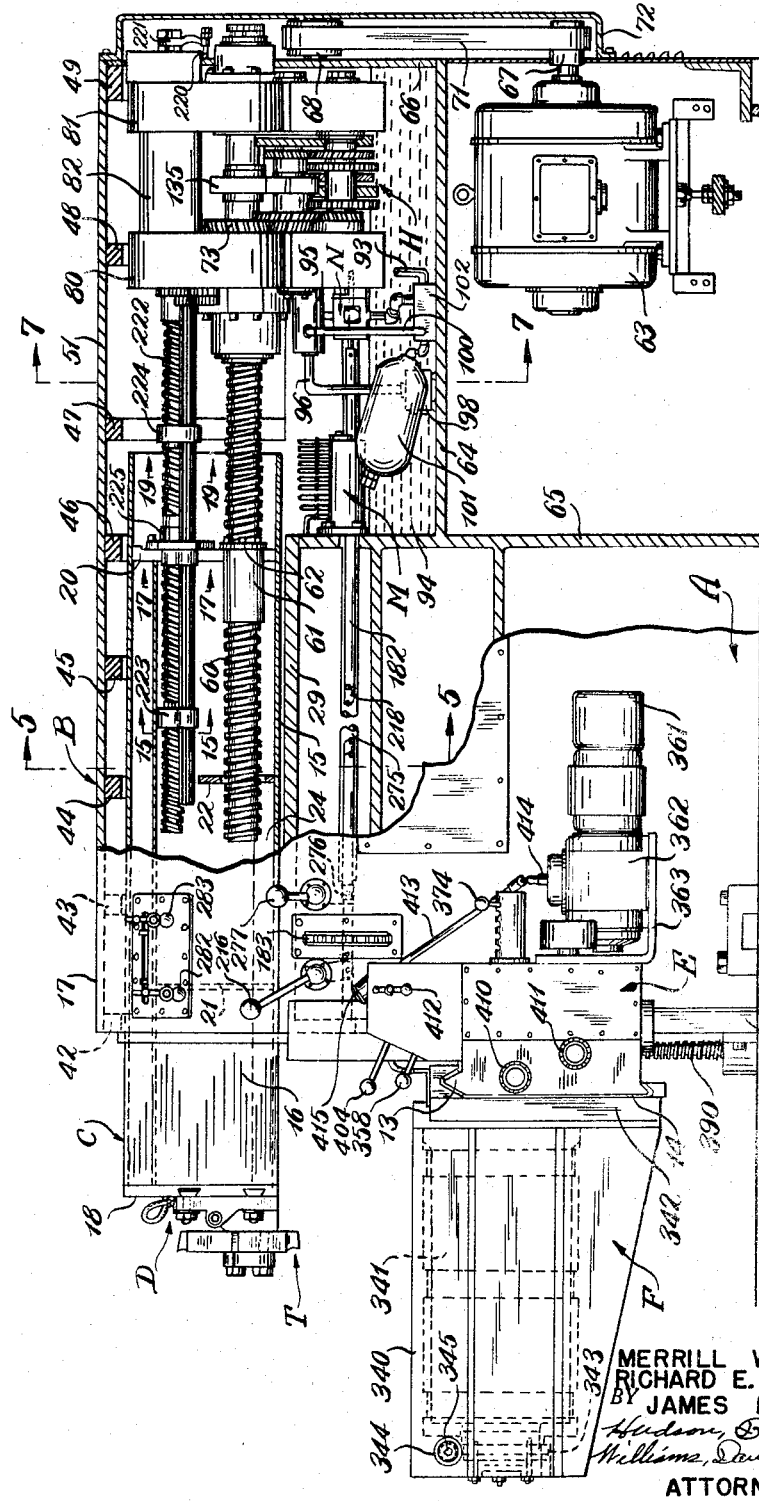
Fig. 2 is a side elevational view of the shaper shown in Fig. 1, with parts broken away, to better show the construction.
Figure 3:
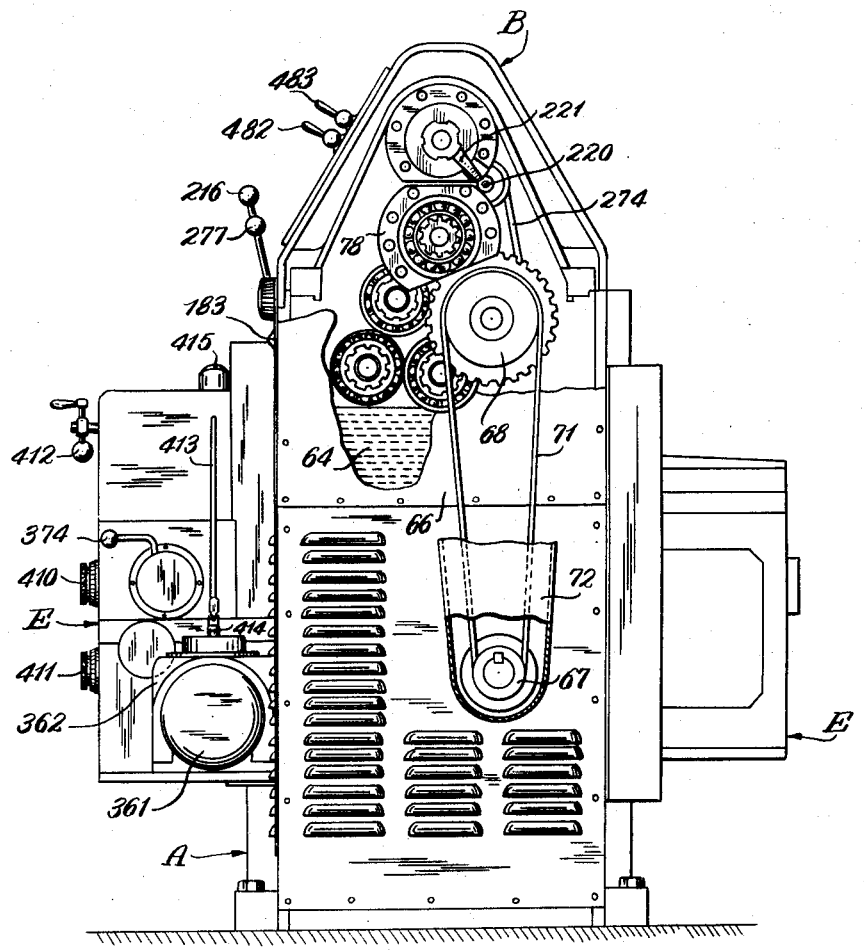
Fig. 3 is a rear end elevational view of the shaper, with parts broken away, to better show the construction.
Figure 4:
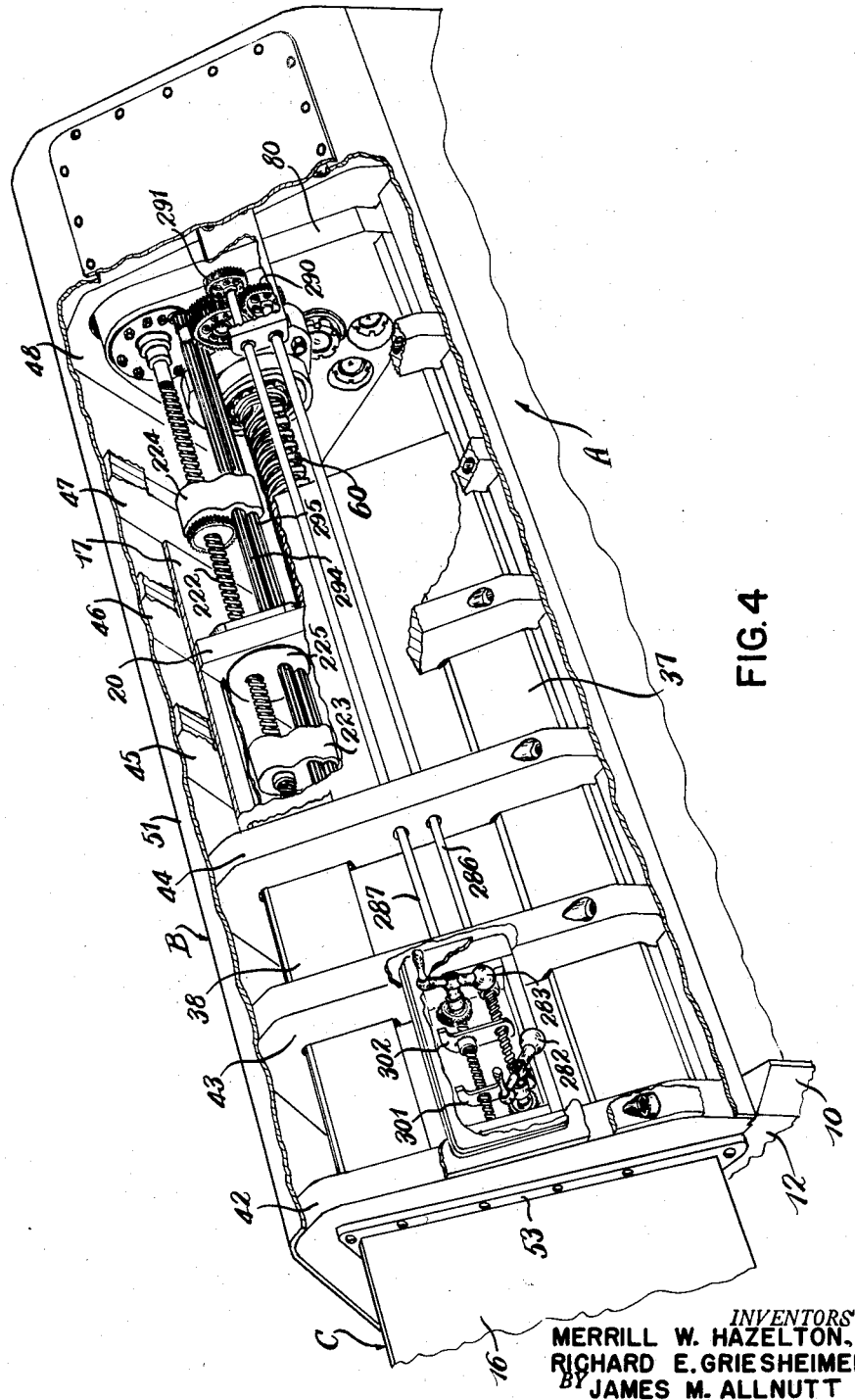
Fig. 4 is a fragmentary, elevational view of a portion of Fig. 1, with parts broken away, to better show the construction.
Figure 5:
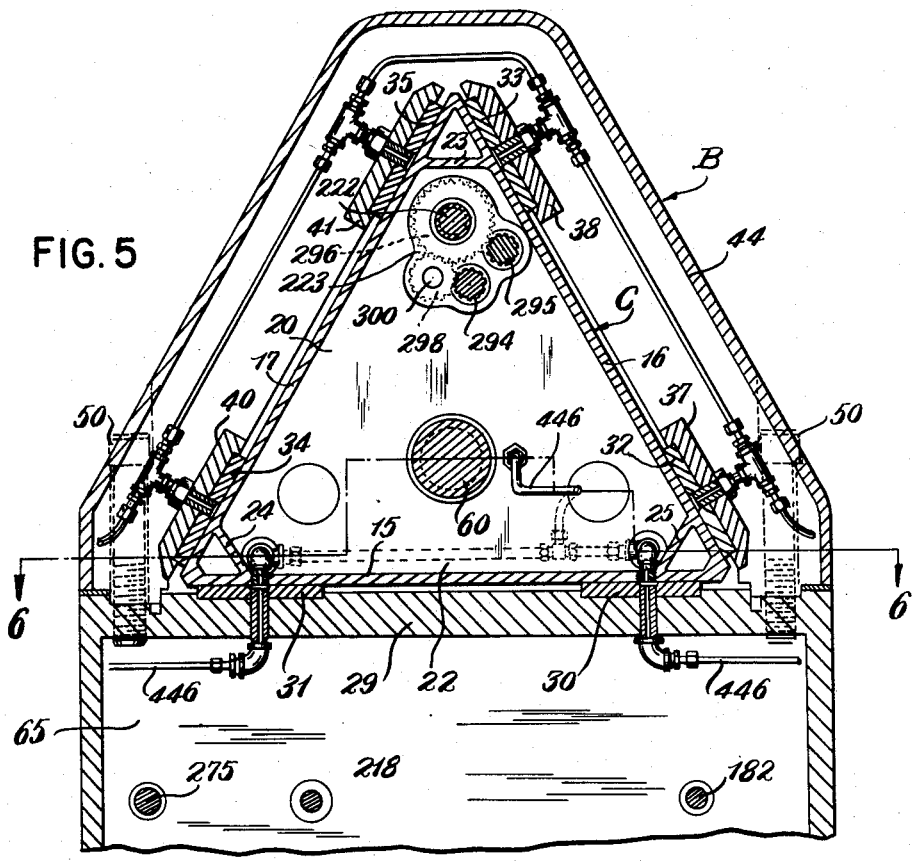
Fig. 5 is a sectional view approximately on the line 5—5 of Fig. 2.
Figure 6:
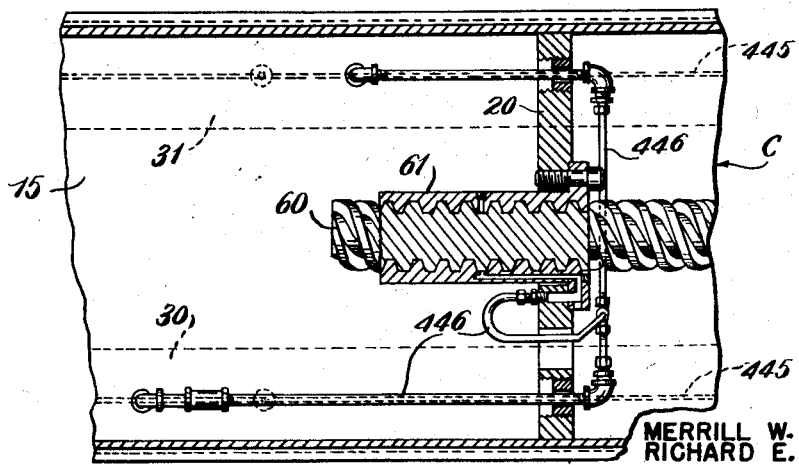
Fig. 6 is a fragmentary sectional view, with portions in elevation, approximately on the line 6—6 of Fig. 5.
Figure 7:
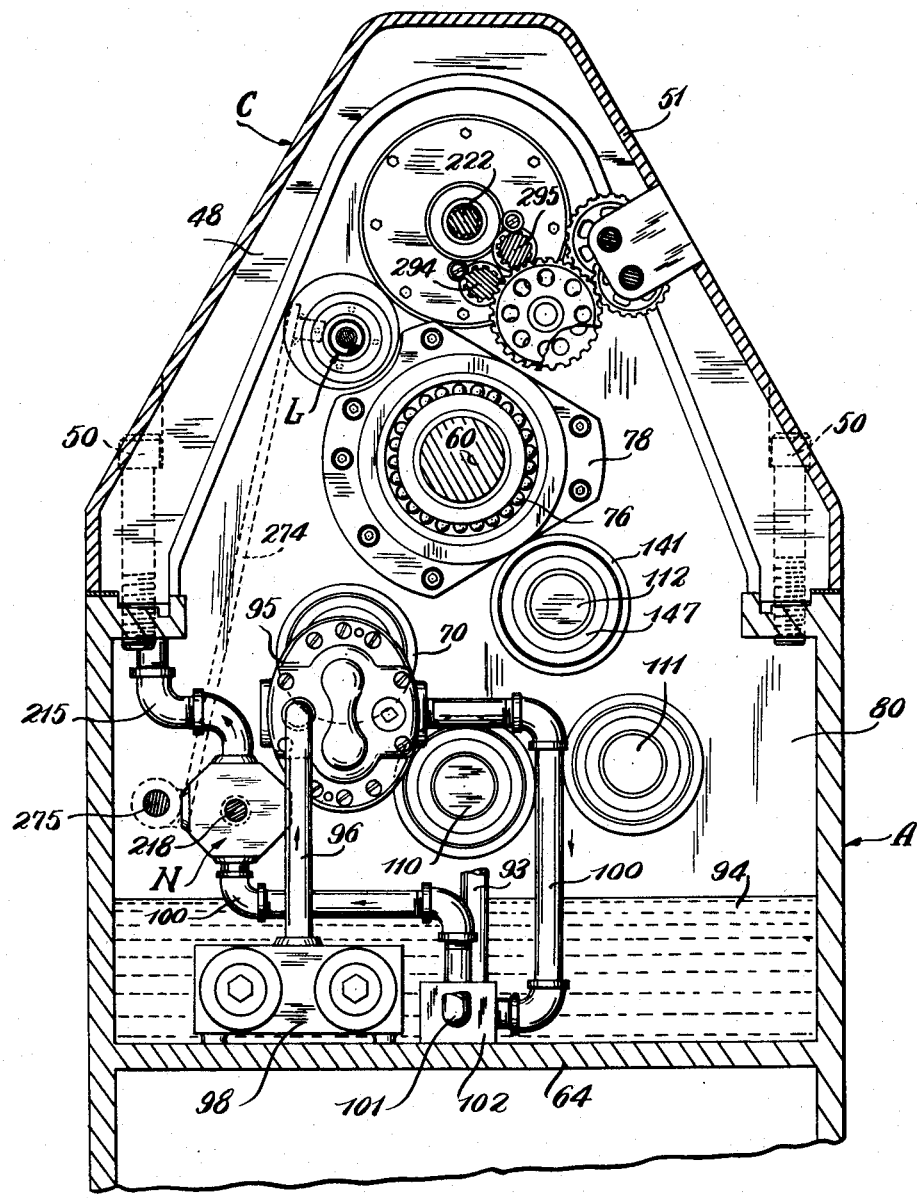
Fig. 7 is a sectional view approximately on the line 7—7 of Fig. 2.
Figure 11:
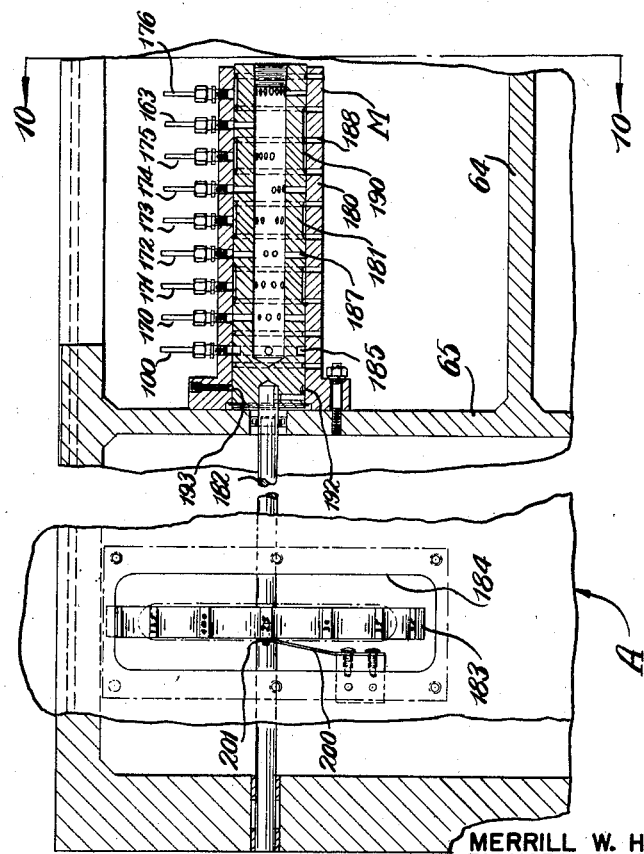
Fig. 11 is a fragmentary sectional view approximately on the line 11—11 of Fig. 10 with portions in elevation.

The speed selector control valve M comprises a flanged valve housing 180 fixedly bolted to the right end of the sump or transmission side of the partition 65, see Figs. 2 and 11, and a valve or spool member 181 rotatably supported therein and operatively connected by a longitudinally extending shaft 182 to a manually controlled speed selector wheel 183 fixed to the shaft 182 adjacent to its left-hand end. The periphery of the wheel 183 is provided with suitable indicia indicating the various ram speeds attainable and its front portion projects through an opening 184 in the front face or wall of the column A at the operator's position adjacent to the front end of the column.

The particular transmission H shown provides 16 different operating speeds and, together with the design of the other parts of the machine shown, is adapted to produce 16 ram speeds ranging from 25 to 400 feet per minute in geometric progression depending upon the different combination of clutches P to S and U to X engaged and disengaged at a particular time. The different clutch combinations which effect the various speeds are controlled by the speed selector valve M which has 16 positions, each of the which causes engagement or disengagement of a predetermined combination of clutches.

The 16 different positions of the speed selector valve M are diagrammatically shown in Fig. 27 but the speed selector valve M will not be described in detail. Suffice to say that the spool valve member 181 is hollow and fluid pressure is admitted to the interior thereof from the conduit means 100 through a suitable port in the valve housing 180 which communicates with an annular groove 185 in the valve spool. The groove 185 is in continuous communication with the interior of the valve spool by a radial aperture in the valve spool 181. From the interior of the valve spool 181 pressure fluid is selectively supplied to the various speed selector clutches by a series of longitudinally spaced radial apertures 187 in the valve spool adapted to selectively communicate with ports in the valve housing opening into the respective conduit means which lead to the various speed selector clutches. The conduit means leading from the valve housing to the respective clutches are adapted to be selectively drained or connected to the sump 94 by longitudinally spaced drain apertures 188 in the valve housing 180, which apertures are adapted to be selectively connected to the conduit means leading from the valve housing to the respective selector clutches by a series of grooves 190 in the valve spool. The arrangement of the various grooves and apertures in the valve spool 181 is such that selected fluid pressure operated clutches P to S and U to X are engaged or disengaged upon the positioning of the valve spool 181 in one of its 16 operating positions in accordance with the diagrammatic showing in Fig. 27.

In the position shown in the drawings, the valve spool is in position to supply pressure fluid to the speed selector clutches P, R, U and W while the other clutches Q, S, V and X are connected to drain, with the result that the gears 114, 120, 124 and 130 are connected to the shafts 70, 110, 111, 112, respectively, and the forward drive gear 73 is rotated at the slowest speed. The annular groove 85 and the radial apertures 187 in the valve spool 181 are interposed between annular grooves which are continuously connected to the sump, with the result that any leakage about the valve spool is drained away.

The various operating positions of the speed selector valve M, as previously stated, are selected by rotation of the speed selector wheel 183 and the wheel is preferably marked with indicia indicating the respective ram speeds for the various settings or positions of the valve. In order to assure positive positioning of the speed selector valve M in its different operating positions, a detent arrangement is provided. The valve spool 181, as shown, is provided with a series of apertures 192, one for each of the operating positions of the valve and into which a spring-pressed detent ball 193 carried by the valve housing 180 is yieldably urged.

Figure 10:
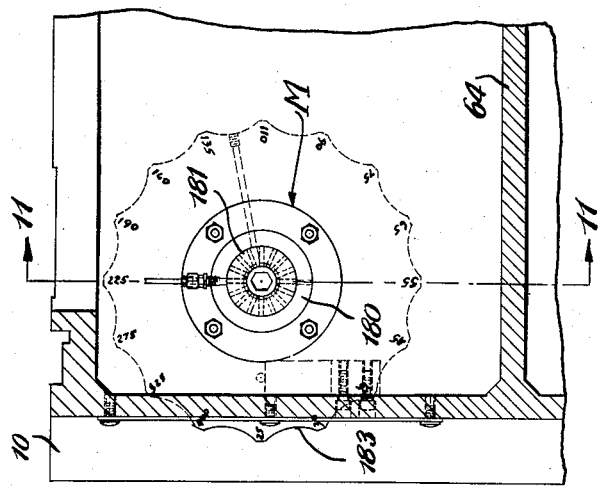
Fig. 10 is a fragmentary sectional view approximately on the line 10—10 of Fig. 11 and showing the speed selection valve and control.

The arrangement of the ports in the speed selector valve M is such that rotation of the speed selector wheel 183 in a clockwise direction, as viewed in Fig. 10, causes an increase in the speed of the ram while rotation in the opposite direction reduces the ram speed. The speed selector wheel 183 may be rotated in either direction with the exception that the speed selector valve M cannot be rotated to effect a speed change from the lowest speed to the highest speed. This is accomplished by the provision of a ratchet arrangement in the form of a leaf-spring 200 having one end connected to the column and the other end in continuous engagement with the left-hand side of the speed selector wheel 183, as viewed in Fig. 11, and which end engages a pin 201 carried by the speed selector wheel 183 to prevent further rotation of the speed selector wheel in a counterclockwise direction when the wheel has been rotated to a position corresponding to the slowest speed of the ram. The construction does not, however, prevent continuous rotation of the speed selector wheel 183 in a clockwise direction, as viewed in Fig. 11, thus permitting the speed of the ram to be changed from its highest to its lowest speed without passing through the intermediate speeds.

The screw 60 is, as previously stated, adapted to be driven in the reverse direction, that is, in a direction to move the ram C in a rearward direction to execute the idle or return stroke by the reverse drive gear 74 rotatably supported concentric with the screw 60 and adapted to be selectively connected to and disconnected from the screw 60 by the fluid pressure actuated, friction disk-type, reverse drive clutch K. The gear 74 is rotatably supported by a suitable bushing, adjacent to the right-hand end of the screw and the alternate disks of the clutch K are splined to an internally splined flange formed integrally with the gear 74 and projecting in a forward direction and to a reduced splined section 205 of the screw 60 to the rear of the splined section 86. The disks of the clutch K are adapted to be compressed in a manner similar to that of the disks of the forward drive clutch J by fluid pressure acting on a piston 206 slidably supported in the left-hand end of the member 78. The cylinder head member of the fluid pressure motor or means for operating the clutch K is formed by a concave-convex disk member 207 positioned on a flanged bushing 208 on the splined section 86 of the screw 60 and separated from the rear end of the sleeve 133 by a thrust bearing washer. Like the piston 87, the piston 206 is tubular and the wall of the head portion slidably engages the sleeve 78 and bushing 208 to form a substantially fluid-tight connection. Fluid for controlling the actuation of the clutch K is admitted to and exhausted from the space intermediate the head portion of the piston 206 and the cylinder head member 207 through aligned apertures in the sleeve member 78 and the framed member 81 forming part of a conduit means 209 leading to the reversing valve L previously mentioned. The interior of the sleeve member 78 to the non-pressure side of the head of the piston 206 is connected to the cooling oil circuit 93 by an opening 210 in the sleeve member 78 and the frame member 81. Cooling oil flows around the outer edges of the clutch plates, which are relieved in a manner similar to the plates of clutch J and drains through holes 211 in the gear 74 to the sump.

The reverse drive gear 74 is continuously in mesh with the gear 113 to the right-hand end of the input or driven shaft 70 of the transmission H, with the result that when the screw 60 is driven in its reverse direction through the reverse drive clutch K, it is always driven at the same high speed and the ram C always returns at the same high speed, which speed is constant throughout the return stroke.

During operation of the machine, the reversing valve L is actuated or reversed at each end of the ram stroke, to alternately engage and disengage the clutches J, K to effect the reciprocation of the ram C through its work and return strokes. When both drive clutches J, K are disengaged, a position selectively obtainable by moving the manually operable ram control valve N to its off position, the screw 60 is preferably held against accidental rotation and possible creep by a fluid pressure activated, disk-type brake Y concentric with the screw 60 and having its alternate disks splined to an interiorly splined portion of the stationary member 90 and to the forward end of the splined section 86 of the screw 60. The disks of the brake Y are compressed to prevent rotation of the screw 60 by fluid pressure acting on a piston 212 concentric with the screw 60 and slidably supported thereon between the member 90 and a head member 213 fixed within the end of the member 77 to the rear of the bearing 75. The piston 212 has a reduced skirt portion which abuts against the left-hand disk of the brake Y and pressure fluid, preferably oil under pressure, is admitted to and exhausted from the space within the member 77 and between the head portion of the piston 212 and the cylinder head member 213 by an aperture in the sleeve member 77 forming a part of a conduit means 214 leading to the ram control valve N.

When the ram control valve N is in its "off" position, the conduit means 214 connected thereto and to the brake Y is connected to the pressure fluid supply conduit means 100 and the brake is engaged. At the same time a conduit means 215 connecting the ram control valve to the reversing valve L is connected to the sump and both driving clutches J, K are disengaged. Alternatively when the ram control valve N is in its "on" position, the conduit means 214 is permitted to drain to the sump and the brake Y is disengaged and the conduit means 215 is connected to the pressure fluid supply conduit means 100 and one or the other of the driving clutches J, K engaged depending upon the position of the reversing valve L. The ram control valve N which controls the flow of pressure fluid to the reversing valve L and in turn the operation of the ram C is bolted to the left hand side of the frame member 80, as viewed in Fig. 2, and is adapted to be manually operated by a lever 216 located at the front of the column. The lever 216 is fixed to the projecting end of a shaft rotatably supported in the near side wall of the column, the rear end of which shaft carries a depending lever fixed thereto, which lever is in turn connected by a rod 218 to the plunger or operating member of ram control valve N.

Figure 12:
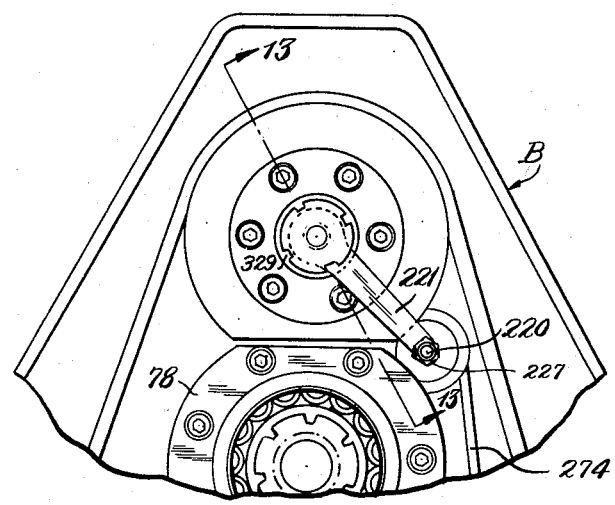
Fig. 12 is an enlarged view of a portion of Fig. 3.
Figure 13:
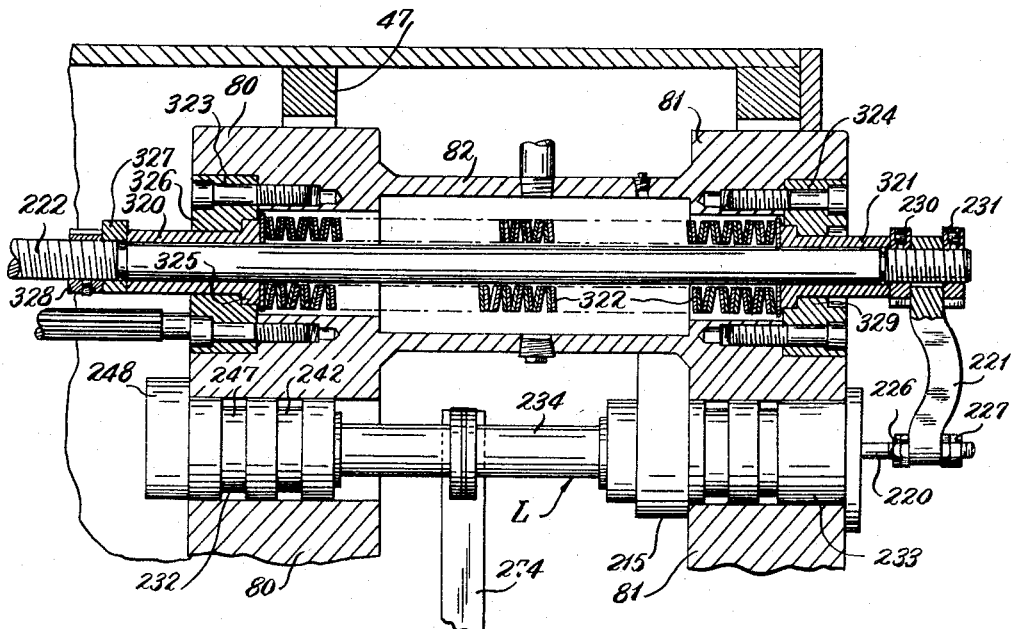
Fig. 13 is a fragmentary sectional view approximately on the line 13—13 of Fig. 12.

As previously stated the ram C is moved in a forward direction to perform its working stroke and in the opposite direction to perform its idle stroke by selective operation of the forward drive clutch J and the reverse or return drive clutch K. The flow of fluid to and from the clutches J, K through the conduit means 91, 210, respectively, is controlled by and the operative position of the clutches reversed at opposite ends of the ram stroke by the ram reversing valve L. The ram reversing valve L is located in the transmission chamber of the column slightly to the rear of and above the drive screw 60 and comprises an operating plunger or rod 220 connected by an arm 221 to the rear end of a so-called bumper screw 222 slidably supported in the frame members 80, 81 and extending forwardly thereof parallel with the drive screw 60. The bumper screw 222 has front and rear adjustable stop assemblies 223, 224 threaded thereon and adapted to be engaged by a bumper assembly 225 fixed to the rear end web or reinforcing plate 20 of the ram C. When the stop assemblies 223, 224 are engaged by opposite ends or sides of the bumper assembly 225, upon reciprocation of the ram C, the bumper screw 222 and, in turn, the actuating rod 220 of the ram reversing valve L is moved longitudinally either toward the front or the rear, as the case may be, to actuate the reversing valve L to reverse the direction of the flow of fluid to the forward and reverse drive clutches J, K. The lower end of the lever 221, see Figs. 12, 13, is connected to the rear end of the reversing valve operating plunger 220 by being clamped between pairs of nuts 226, 227 threaded into the rear end of the plunger. This permits adjustment of the operating plunger 220 relative to the bumper screw 222. The upper end of the arm 221 is fixed to the rear end of the bumper screw 222 by being clamped between nuts 230, 231 threaded thereon.

Figure 14:
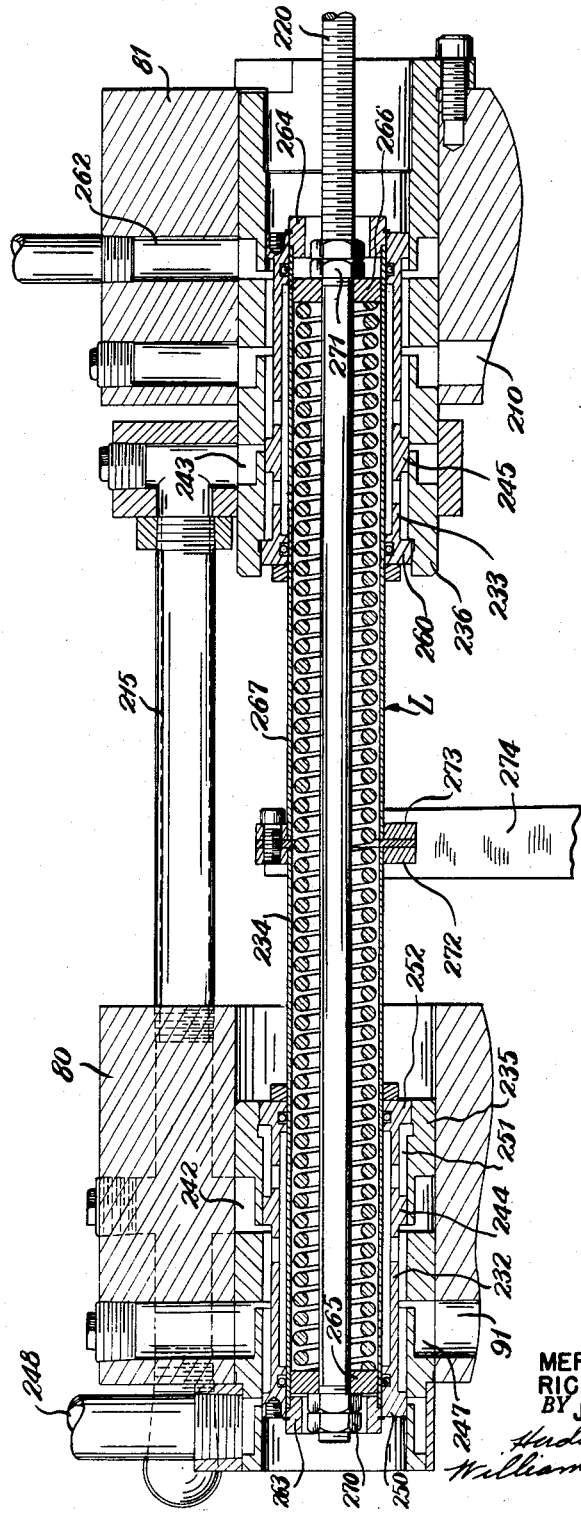
Fig. 14 is a fragmentary longitudinal sectional view through the ram reversing valve.
Figure 15:
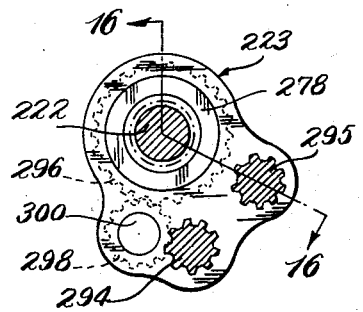
Fig. 15 is a fragmentary enlarged sectional view approximately on the line 15—15 of Fig. 2.
Figure 16:
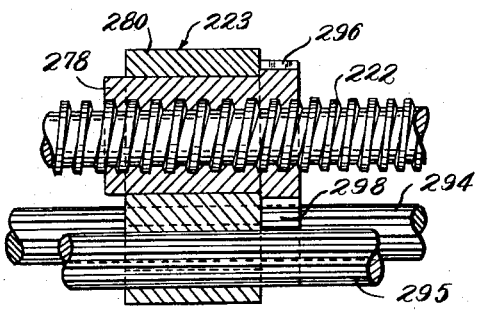
Fig. 16 is a fragmentary sectional view approximately on the line 16—16 of Fig. 15.
Figure 17:
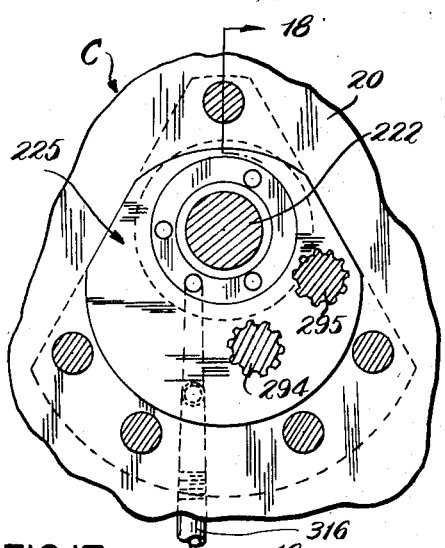
Fig. 17 is an enlarged fragmentary sectional view approximately on the line 17—17 of Fig. 2.
Figure 18:
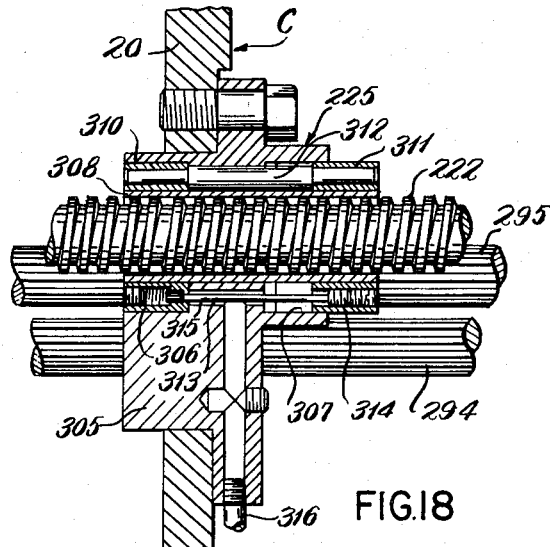
Fig. 18 is a sectional view approximately on the line 18—18 of Fig. 17.
Figure 19:
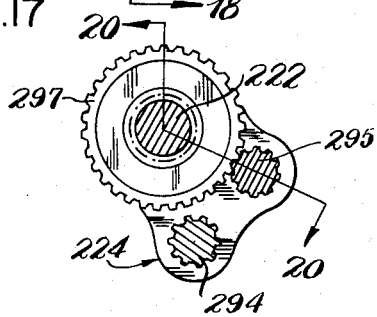
Fig. 19 is a fragmentary enlarged sectional view approximately on the line 19—19 of Fig. 2.
Figure 20:
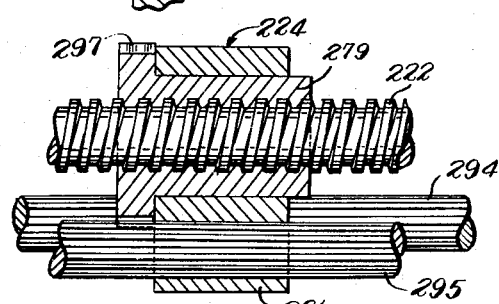
Fig. 20 is a sectional view approximately on the line 20—20 of Fig. 19.
Figure 26:
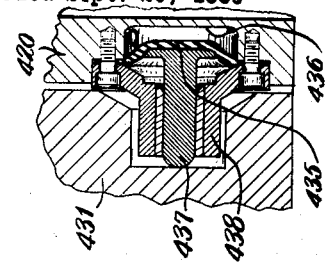
Fig. 26 is an enlarged fragmentary view of a portion of Fig. 25.
Figure 25:
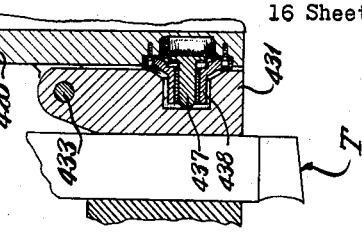
Fig. 25 is a fragmentary sectional view with portions shown in elevation approximately on the line 25—25 of Fig. 23.
Figure 24:
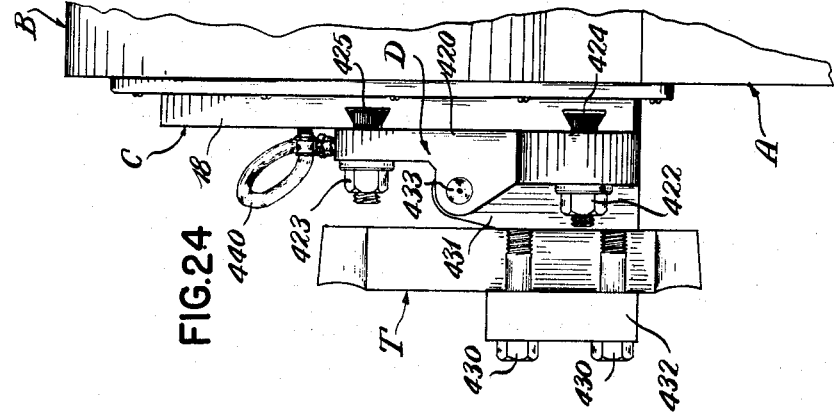
Fig. 24 is a side elevational view of the parts shown in Fig. 23 with the ram retracted to its rearmost position.
Figure 23:
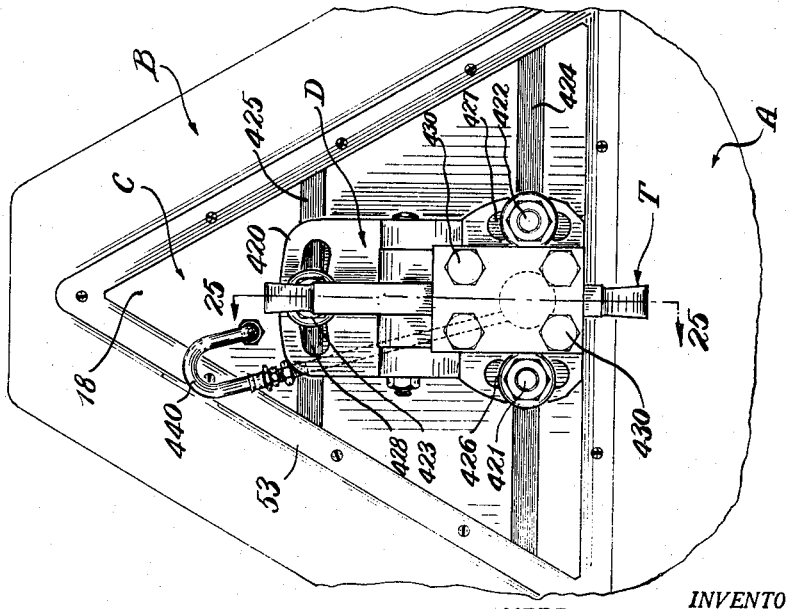
Fig. 23 is an enlarged fragmentary front elevational view of the ram and adjacent parts of the frame.

The reversing valve L, see Fig. 14, comprises two sleeve-like valve members or spools 232, 233 supported on and adjustably fixed to opposite ends of a two part tubular member 234. The valve spools 232, 233 are slidably supported in valve housings 235, 236 fixed within suitably aligned apertures in the frame members 80, 81. Pressure fluid from the ram control valve N is conducted to the valve housings 235, 236 by suitable conduit means 215 previously mentioned and which includes apertures formed in the frame members 80, 81. The conduit means 215 communicates with external annular grooves 242, 243 in the valve housings 235, 236, respectively, which grooves terminate in annular ports opening into the interior of the valve housings. The ports are adapted to be selectively opened and closed by annular flanges 244, 245 on the valve spools 232, 233, respectively, as the valve spools are reciprocated upon movement of the bumper screw 222. The forward drive clutch J or, more specifically, the fluid chamber thereof is continuously in communication with the interior of the valve housing 235 to the left of the annular flange 244, as viewed in Fig. 14, by the conduit means 91 including an external annular groove 247 in the valve housing 235, which groove is, in turn, constantly in communication with the interior of the valve housing. The conduit means 91 and, in turn, the fluid pressure chamber of the forward drive clutch J is selectively connected to the conduit means 215 for supplying pressure fluid to the clutch J or to a fluid discharge conduit 248 to permit fluid in the fluid chamber of the clutch J and the conduit means 91 leading thereto to drain into the sump 94 by the annular flange 244 on the valve spool 232 and a second annular flange 250 on the left-hand end of the valve spool, which flange is adapted to close the port in the valve housing leading to the discharge conduit means 248 when the port leading to the supply conduit means 215 is open and vice versa.

Radial apertures in the valve spool at opposite sides of the annular flange 244 communicate with an annular groove in the interior of the valve spool for the purpose of equalizing the pressure at opposite sides of the annular flange 244 and for supplying fluid pressure to and exhausting the same from a chamber 251 formed between the exterior of the valve spool 232 and the valve housing 235 by the annular flange 244 and a third annular flange 252 on the valve spool 232 to the right of the flange 244, which flange 252 is of larger diameter than the flange 244 and slidably engages in a counterbore formed in the right-hand end of the valve housing 235. The construction is such that when fluid pressure is supplied to the conduit means 91 leading to the forward drive clutch J, a differential pressure is applied to the annular flanges 244, 252 on the valve spool 232, with the result that since the annular flange 252 is larger than the flange 244, the valve spools 232, 233 and their supporting tubular member 234 are shifted to their right-hand position with the annular flange 260 on the valve spool 233, which annular flange corresponds with the annular flange 252 of the valve spool 232, in engagement with the shoulder formed by the counterbore in the left-hand end of the valve housing 236 corresponding to the counterbore in the right-hand end of the valve housing 235 and within which the flange 252 reciprocates.

The valve spool 233 and the valve housing 236 forming that part of the reversing valve L for controlling the flow of pressure fluid to and from the reversing drive clutch K is similar in construction to the corresponding parts of the reversing valve which controls the flow of pressure fluid to and from the forward drive clutch J, except for the fact that they are reversed in position, and will not be described in detail. Suffice it to say that when the reversing valve is in position to supply pressure fluid to the forward drive clutch J, the reverse drive clutch K or, more specifically, the fluid chamber for operating the same, is connected by way of the conduit means 210, which conduit means connects the reverse drive clutch K with the reversing valve L to the drain conduit means 262, and the clutch released. Alternatively when the ram reversing valve L is in position to connect the forward drive clutch J or the fluid chamber thereof to the vent or drain conduit means 248, the reverse drive clutch K or, more specifically, the pressure fluid chamber thereof is connected to the pressure fluid supply conduit means 215 through the valve housing 236, etc., and the conduit means 210 and the reverse driving clutch engaged.

When the reversing valve L is in position to supply pressure fluid to the forward drive clutch J, the reversing valve including the valve spools 232, 233 are held in the position shown in Fig. 14, that is, with the flange 260 on the spool 233 in engagement with the bottom of the counterbore within which it reciprocates and when pressure fluid is supplied to the reverse drive clutch K, the valve spools are held in their reversed position, that is, with the annular flange 252 on the valve spool 232 in engagement with the shoulder formed by the bottom of the counterbore within which it reciprocates by pressure fluid applied between the annular flanges 245 and 260 of the valve spool 233.

Opposite ends of the two-part member 234 to which the valve spools 232, 233 are connected are provided with annular collar-like members 263, 264 fixed thereto and through which the reversing valve operating plunger 220 projects and is freely movable. The operating plunger 220 is slidably supported coaxially with the two-part tubular member 234 by means of annular members 265, 266 slidably supported thereon and which in turn are slidably supported within the tubular member 234. The annular members 265, 266 are engaged by opposite ends of a compression spring 267 located within the tubular member 234 and surrounding the operating plunger 220, which spring biases the annular members 265, 266 into engagement with pairs of nuts 270, 271, the former of which are threaded onto the left-hand end of the operating plunger 220 and the latter upon the opposite threaded end of the operating plunger. The construction is such that by adjusting the nuts 271 lengthwise of the plunger 220, the annular members 265, 266 can be moved toward or from each other to increase or decrease the bias of the spring 267 and to increase or decrease the distance therebetween, thus necessitating more or less movement of the operating plunger 220 before the annular members 265, 266 thereon engage the collar-like members 263, 264, respectively, and in turn shift the two-part tubular member 234 and the valve spools 232, 233 connected thereto. This construction provides means for changing the timing of the operation of the ram reversing valve L with respect to the movement of the operating plunger or rod 220 and, in turn, the bumper screw 222. By decreasing the distance between the annular members 265, 266 the amount of travel required of the operating rod 220, etc. is increased before the annular members 265, 266, as the case may be, strikes its respective collar-like members 263, 264. This delays the shifting of the valve spools 232, 233 of the reversing valve L and in turn delays the reversing of the ram C.

To facilitate setting up work on the machine and for other purposes, manual means is provided for controlling or moving the ram reversing valve L. As shown, the two parts of the tubular member 234 have their adjoining ends provided with external flanges 272, 273 detachably bolted together with a spacing washer therebetween. The flanges form an annular collar on the member 234 about midway between the frame members 80, 81. The collar is engaged between a pair of tines on the upper end of a lever 274 carried by a longitudinally extending rod 275 to which it is adjustably fixed by a setscrew or the like. The rod 275 is slidably supported in the column and its forward end is connected to a depending lever 276 on a transverse shaft, the forward end of which projects through the near side of the column adjacent to the front of the machine, as viewed in Figs. 1 and 2, where it is provided with a manually operable lever 277. The construction is such that oscillation of the manually operable lever 277 reciprocates the rod 275 and in turn the lever 274 and the operating member 234 of the ram reversing valve L.

The length and position of the stroke of the ram with respect to the column A can be adjusted by adjusting the ram stop assemblies, designated generally as 223, 224 along the bumper screw 222. The stop assemblies comprise sleeve-like nut members 278, 279 rotatably supported in bracket members 280, 281 and adapted to be rotated relative to the bumper screw 222 and their respective bracket members by manually operable crank levers 282, 283, respectively, located on the exterior of the cap B at the operator's end of the machine. The crank levers 282, 283 are connected to the projecting ends of shafts rotatably supported in a cover plate on the cap B, the inner ends of which shafts are connected by suitable miter gears to longitudinally extending shafts 286, 287 projecting toward the rear of the machine where their rear ends are rotatably supported in the frame member 80. Gears 290, 291 fixedly secured to the shafts 286, 287 adjacent to the frame member 80 are continuously in mesh with two idler gears rotatably supported on a short shaft carried by the frame member 80, which idler gears are in turn mesh with two longitudinally extending, splined shafts 294, 295, respectively, rotatably supported in the frame member 80 and the stop and bumper assemblies 223, 224 and 225 through which they project.

The longitudinally extending, splined shafts 294, 295 are operatively connected with gears 296, 297 formed integral with the adjustable stop members 278, 279, respectively. The gear 296 on the former stop member 278 is connected with the splined shaft 294 through the interim of an idler gear 298 rotatably supported on the short shaft 300 fixed in the bracket 280. Th gear 297 on the stop member 279 is in mesh with the shaft 295. The forward ends of the longitudinally extending shafts 286, 287 are threaded and provided with indicating members 301, 302 having threaded engagement with the shafts 286, 287, respectively, and sliding engagement with the other shaft. The indicating members 301, 302 have projecting portions extending through a suitable slot in the cover plate at the forward near side of the cap B and through which the shafts that carry the crank levers 282, 283 project. The cover plate is provided with indicia adjacent to one or both sides of the slot through which the indicators 301, 302 project, the construction being such that the indicating members 302, 301 show the length of the ram stroke and its position relative to the column A. The stops 223, 224 can be readily adjusted by merely rotating one or both of the crank levers 282, 283 to change the length of the ram stroke or its position, as desired.

The bumper assembly 225 carried by the ram and which is adapted to engage the adjustable stop assemblies 223, 224 at opposite ends of the ram stroke may be of any desired construction. The bumper assembly shown incorporates cushioning means for lessening the shock imparted to the adjustable stop assemblies by the ram. As shown, the bumper assembly comprises a flanged sleeve member 305 detachably bolted to the reinforcing web or member 20 of the ram C and counterbored at opposite ends as at 306, 307 to form with an internal bearing member 308 surrounding the bumper screw, dashpot chambers at opposite ends of the sleeve within which front and rear annular pistons 310, 311 are slidably supported. The pistons 310, 311 are connected together in spaced relation by a pair of rods 312 fixed thereto at opposite sides of the bumper screw 222. The flanged sleeve member 305 is provided with suitable apertures through which the rods 312 project. The adjoining ends of the counterbores 306, 307 are connected at opposite sides of the bumper screw by apertures 313 in the flanged sleeve member for the passage of fluid, preferably oil, from one counterbore to the other as the annular pistons 310, 311 engage the forward and reverse adjustable stop assemblies 223, 224, respectively, upon reciprocation of the ram C. Flow of fluid from one counterbore to the other is metered by a screw 314 threaded into the annular piston 311 and having a reduced shank 315 projecting into the other annular piston through the aperture 313. The size of that portion of the reduced shank 315 of the screw 314 projecting through the aperture 313 meters or determines the rate of flow of oil from one counterbore to the other. The apertures 313 are preferably connected as by conduit means 316 to the source of fluid pressure, that is, in the present instance the pump 95, so that any oil lost about the pistons 310, 311, etc. will be made up.

As previously stated, the bumper screw 222 is slidably supported in the frame of the machine to the rear of the ram. The rear or right-hand end of the screw, see Fig. 13, is supported in the frame members 80, 81 by disklike members 323, 324 slidably supported in aligned apertures in the upper ends of the frame members 80, 81, and which members 323, 324 form seats for a heavy disk-type compression spring 322 concentric with the screw 222 and having its opposite ends telescoped within the apertures in the frame members 80, 81 within which the disk members 323, 324 are located. The bumper screw 222 projects through flanged bearing members 320, 321 interposed between the screw proper and the members 323, 324, respectively. Movement of the forward spring seat 320 towards the left is limited by interfering flanges 325, 326 on the members 320, 323, respectively. The seat 320 is adapted to be moved towards the right, as viewed in Fig. 13, upon movement of the bumper screw 222 towards the right by the engagement of a collar 327 on the bumper screw 222 with the adjacent end of the member 320. Movement of the collar 327 towards the left along the screw 220 is limited by a lock nut 328 threaded on the screw 220 and adjustable therealong. The rear spring seat 321 abuts against an internal flange 329 on a member 324. The construction is such that when load is applied to the bumper screw 222 by the engagement of the bumper assembly 223 on the ram with the rear stop assembly 224, the bumper screw 222 is moved towards the rear, as viewed in Fig. 13, to compress the spring 322. The spring is compressed to such an extent that a large portion of the concentric energy of the ram C is stored in the spring 322. At the same time, the arm 221 attached to the bumper screw actuates the control or operating plunger 220 of the reversing valve L, with the result that the direction of rotation of the drive screw 60 is reversed, and as the direction of movement of the ram changes, the energy stored in the spring 322 is returned to the ram resulting in a quick reversal of its direction of travel. The timing of the ram reversing valve L may be changed by adjusting the nuts 226, 227, 270, 271, as previously explained, so that the greatest advantage can be obtained from the spring 322.

The table shown, designated generally by the reference character F, comprises a rectangular member 340 constituting the table proper and rotatably supported on a longitudinally extending boss 341 projecting from a table slide 342 supported on the ways 13, 14 of the rail E. The top and both sides of the member 340 are provided with T-slots to facilitate the clamping of work, or a workholder thereto. The underside of the member 340 slopes downwardly towards the rear of the machine so as to reduce the weight of the overhang on the rail. The strength of the member, however, is not materially affected. The member 340 which, as previously stated, forms the table proper is adapted to be rotated about the boss 341 by a worm and worm wheel drive comprising a worm wheel 343 fixed to the front or left-hand end of the boss 341 and continuously in mesh with a worm 344 keyed to a transversely extending shaft 345 rotatably supported in the member 340 and having a projecting end adapted to receive a hand crank 346. The ability to adjust the member 340 about the boss 341 is of particular utility in the machine illustrated which, as will be hereinafter described, incorporates means for power feeding the table at an angle, as well as either vertically or horizontally.

The table F is adapted to be moved along the ways 13 and 14 of the rail E either continuously or intermittently in timed relation to the reciprocation of the ram C, by power means comprising a lead screw 347 rotatably supported in the frame member 348 of the rail E and having threaded engagement with a suitable nut (not shown) carried by a bracket 350 fixed to the rear side of the table slide 342. The right-hand end of the screw 347, as viewed in Fig. 1, is provided with two like bevel gears 351, 352 rotatably supported thereon. The gears face one another and are continuously in mesh with a bevel gear 353 fixed to the forward end of a shaft 354 rotatably supported by suitable antifriction bearings in the frame member 348 of the rail E. The gears 351, 352 are adapted to be driven in opposite directions by the gear 353 and are adapted to be selectively connected to the lead screw 347 by a clutch member or spool 355 located between the gears and slidably keyed to the lead screw 347. The member 355 has clutch teeth on opposite ends adapted to engage suitable clutch teeth on the hubs of the gears 351, 352. The clutch member 355 is adapted to be positioned in a neutral or intermediate position between the gears 351, 352, or have its clutch teeth selectively engaged with one or the other of the gears to rotate the lead screw in a forward or reverse direction by an eccentric pin 356 fixed to the lower end of a rearwardly inclined, generally vertical shaft 357, which eccentric pin engages in a suitable groove in the circumference of the clutch member 355. The shaft 357 is rotatably supported in the frame member 348 of the rail E and is provided at its upper end with a forwardly extending hand lever 358 for positioning it and, in turn, the clutch member 355 in one of its three normal positions. The hand lever 358 projects forwardly through a slot in a covered plate 359 detachably connected to an inclined part of the frame member 348 of the rail E. The direction in which the gear 353 is normally driven is preferably such that the work table F moves along the rail in the same direction as the direction in which the hand lever 358 is moved to engage the clutch member 355 with one or the other of the gears 351, 352. A spring pressed detent carried by the frame member 348 of the rail E and engageable in slots 360 in the shaft 357 retains the clutch member 355 in the selected neutral or engaged position.

The shaft 354 is, in the embodiment shown, adapted to be either intermittently or continuously driven by an electric motor 361 connected by an infinite variable speed transmission 362, and a series of change gears, designated generally by the reference character Z, and housed within the frame member 348 of the rail E. The motor 361 and the infinite variable speed transmission 362 are carried by a bracket 363 connected to the frame member 348 and the driving shaft 364 of the transmission is provided with a pinion 365 keyed thereto and continuously in mesh with a gear 366 keyed to a shaft 367 rotatably supported in the rail frame member 348 below the shaft 354 previously referred to. The gear 366 is continuously in mesh with a gear 368 rotatably supported on the shaft 354 and adapted to be selectively connected thereto by a sliding key 370, the righthand end of which, as viewed in Fig. 21, is provided with a projection 371 engaging within an internal groove 372 in a member 373 slidably supported on the projecting righthand end of the shaft 354 and adapted to be moved therealong by a hand grasp 374 projecting through a slot 375 in a housing 376 fixed to the rear of the rail frame member 348.

In addition to the gear 366, the shaft 367, in the embodiment shown, has four additional gears 380, 381, 382, 383 keyed thereto and continuously in mesh with gears 384, 385, 386, 387, respectively, rotatably supported on the shaft 354 in a manner similar to that in which the gear 368 is supported thereon. Each of the five sets of gears connecting the shafts 354, 367 is of a different ratio, from which it follows that the speed of rotation in the shaft 354, relative to the speed of rotation in the shaft 367, can be varied by sliding the member 373 and, in turn, the key 370, along the shaft 354 by means of the hand grasp 374 to connect one or the other of the gears 368, 384–387 to the shaft 354. For the purpose of retaining the hand lever 374 in a selected position, the slot 375 in the housing 376 has notches formed therein corresponding with the different operational positions of the hand grasp. The gears on the shaft 367 are spaced from one another so as to provide a neutral or disengaged position for the key 370 between the respective gears.

The rail E, and in turn the table F, is adapted to be moved vertically along the ways 10, 11 by a nut (not shown) rotatably supported in the frame member 348 of the rail E but fixed against linear movement therein and having threaded engagement with a vertical screw 390 fixed to the column A adjacent to the front wall of the column. The nut mentioned comprises a bevel gear continuously in mesh with a bevel pinion splined to a transversely extending spline shaft 391 rotatably supported in the frame member 348 of the rail E in a manner similar to that in which the screw 347 is supported therein.

The right-hand end of the shaft 391 is provided with two like bevel gears 392, 393 rotatably supported thereon and continuously in mesh with a beveled gear 394 fixed to the forward end of the shaft 367. The gears 392, 393 are adapted to be selectively connected to the spline shaft 391 by a clutch member 395, similar to the clutch member 355 previously referred to, slidably keyed to the shaft 391 intermediate the gears 392, 393. The clutch member 395 is adapted to be held in an intermediate disengaged position between the gears 392, 393 or shifted longitudinally of the shaft 391 to operatively connect one or the other of the gears thereto by an eccentric pin 396 projecting into a suitable groove in the clutch member 395 and carried by a member 397 rotatably supported in a bracket 398 fixed to the frame member 348 of the rail E. The member 397 is provided with a lever 400 connected to a vertically movable shaft 401 by a pin 402 connected to a fitting on the lower end of the shaft 401 and engaging within a slot 403 in the free or projecting end of the lever 400. The shaft 401 is slidably supported in the frame member 348 of the rail E and has a hand grasp 404 connected to its upper end. The hand grasp 404 projects forwardly through a vertical slot in the face plate 359 of the rail E. The construction is such that as the hand grasp 404 is raised or lowered, the lever 400 is actuated to rotate the member 397 and, in turn, shift the clutch member 395 to or from its three operating positions, and the direction of rotation of the gear 394 is preferably such that the rail E and, in turn, the table F will be raised or lowered in accordance with whether the hand grasp 404 is raised or lowered. A spring-pressed detent 405 engageable in suitable slots or recesses 406 in the member 397 retains the clutch member 395 either in its neutral or one or the other of its operative positions. The ends of the screw 347 and the spline shaft 391 adjacent to the operator's position are provided with compound indicating dials 410, 411 of conventional construction.

In the embodiment of the invention shown, transverse movement of the rail E or table F, as well as different rates of speed movement, can be obtained by varying the ratio of the infinite variable speed transmission 362 by means of a hand grasp 412 connected by a worm and worm wheel drive to a shaft 413, the lower end of which is connected by a universal joint to the control shaft 414 of the transmission 362, and the upper end of which is provided with a dial indicator 415 which gives an indication of the setting of the transmission 362. The infinite variable transmission may be of any commercial construction. The particular transmission shown is manufactured and sold by Graham Transmissions, Inc., of Milwaukee, Wisconsin, and is of the general type covered by United States Patent No. 2,535,409, issued December 26, 1950, and will not be described in detail.

The variable speed transmission used is preferably of a type which slips under full load, thus permitting rotation of the shaft 367 to be interrupted as by the application of a fluid pressure operated brake, designated generally by the reference character 416, without stopping the member 361. The brake 416 shown is similar to the brake Y previously described, and may be applied during the cutting stroke of the ram C to stop the table movement. In the embodiment shown, the brake 416 is connected to the conduit means 91 for operating the forward drive clutch J and is applied to hold the shaft 367 stationary during the cutting stroke of the tool T. If the brake 416 is not used, the table is preferably given a slow continuous feed movement.

With the construction shown, the rail may be moved vertically and the table simultaneously moved horizontally to effect an angular feed of work carried on the table by engaging the clutch member 355 with one or the other of the gears 351, 352, and the clutch member 395 with one or the other of the gears 392, 393, and the key 370 with one of the gears 368, 384–387. The ratio of the sets of gears 366 and 368, 380 and 384, 381 and 385, 382 and 386, 383 and 387 are preferably, such as to give predetermined angular feeds; for example, 15°, 30°, 45°, 60° and 75°, respectively.

While it is to be understood that any suitable form of tool head may be employed, the tool head D shown comprises a frame member 420 adjustably connected to the front plate 18 of the ram C by bolts 421, 422, 423 having their heads engaged within generally horizontal T-slots 424, 425 in the plate 18 and their shanks extending outwardly through arcuate slots 426, 427, 428 in the frame member. The heads of the bolts 421, 422 are located in the bottom horizontal T-slot 424 and the arcuate slots 426, 427 through which their shanks project are generally vertical, whereas the arcuate slot 428 through which the shank of the bolt 423 in the upper horizontal T-slot 425 projects is substantially horizontal, thus permitting a limited pivotal adjustment of the tool head D relative to the ram C about a generally horizontal axis extending longitudinally of the length of the ram C.

The tool T, as shown, is clamped by means of bolts 430 between the front face of a clapper box 431 and a clamp member 432. The clapper box member 431 and, in turn, the tool T are pivotally connected to the tool head D by a pintle pin in the form of a bolt 433 projecting through aligned holes in projecting lugs formed integral with the frame member 420.

In the embodiment shown, the tool T is lifted clear of the work on the return stroke of the ram C by a diaphragm type piston 435 located in a suitable bore 436 in the front face of the frame member 420 of the tool head D and comprising a forwardly extending plunger 437 adapted to engage and move the clapper box member 431 about its pivot 433 upon the application of pressure fluid to the chamber 436 behind the diaphragm piston 435. The plunger 437 is slidably supported by a flanged sleeve 438 bolted to the frame member 420. Pressure fluid is adapted to be alternately admitted to the chamber 436 in the member 420 behind the diaphragm piston 435 to raise the tool and allowed to drain therefrom to permit the tool to return to its lower or cutting position by suitable conduit means, designated generally as 440, leading to a two-position control valve 441 connected to the conduit means 210 which in turn connects the reverse drive clutch K to the ram-reversing valve L. The construction is such that upon actuation of the reversing valve L to supply pressure fluid to the reverse drive clutch K to reverse the direction of rotation of the drive screw 60 and retract the ram C, pressure fluid is applied through the valve 441, assuming the valve is in its "on" position, to the chamber 436 in the tool head D to lift the clapper box and, in turn, the tool.

As previously mentioned, provision is made for applying oil under pressure to the various ways and moving parts of the machine including the nut 61 within which the screw 60 rotates. For this latter purpose, oil is conducted to the nut 61 from grooves 445 in the upper surfaces of the bottom ram ways 30, 31 to which it is supplied under pressure by the pump 95 and conduit means 100, 446, by conduit means 446 in the ram C.

From the foregoing description of the preferred embodiment of the invention, it will be apparent that the objects heretofore enumerated, and others, have been accomplished. While the preferred embodiment of the invention has been described in considerable detail, the invention is not limited to the particular construction shown and it is our intention to hereby cover all adaptations and modifications and uses thereof which come within the practice of those skilled in the art to which the invention relates.

Having thus described our invention, we claim:

1. In a machine of the character described, an elongated frame, a slide supported in the front end of said frame, a driving screw drivingly supported in said frame, a nut fixedly secured to said slide and having threaded engagement with said screw, forward and reverse driving gears rotatably supported coaxial with said driving screw, power actuated means for rotating said forward and reverse driving gears in opposite directions, pressure fluid actuated friction disk clutch means supported coaxial with said driving screw for operatively connecting and disconnecting said forward and reverse driving gears with said driving screw to reciprocate said tool carrier, valve means for controlling the flow of pressure fluid to and from said clutch means, and a control screw slidably supported by said frame and extending generally parallel with said driving screw, means operatively connecting said valve means and said control screw for actuating said valve means to reverse the direction of flow of fluid to said pressure actuated clutches upon reciprocation of said control screw, a pair of stops having threaded engagement with said control screw, abutment means carried by said slide and interposed between said stops for engagement therewith upon reciprocation of said slide, control means carried by said frame spaced from said stops for individually adjusting said stops along said control screw, and means for operatively connecting said control means to said stops.

2. In a machine of the character described, a frame assembly, a ram assembly slidably supported in said frame assembly for lineal movement, reversible power means for reciprocating said ram assembly, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on one of said assemblies spaced from said first and second control means for individually adjusting said first and second control means lengthwise of the direction of movement of said ram assembly, means operatively connecting said last named means to said first and second control means, and means actuated by engagement between said first and second control means and said third control means for reversing said power means.

3. In a machine of the character described, a frame assembly, a ram assembly slidably supported in said frame assembly for lineal movement, reversible power means for reciprocating said ram assembly, first and second control means carried by one of said assemblies for adjustment relative to one another lengthwise of the direction of movement of said ram assembly, a third control means carried by the other of said assemblies and adapted to alternatively engage said first and second means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, and means actuated by engagement between said first and second control means and said third control means for reversing said power means.

4. In a machine of the character described, a frame assembly, a ram assembly slidably supported in said frame assembly for lineal movement, reversible power means for reciprocating said ram assembly, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, means actuated by engagement between said first and second control means and said third control means for reversing said power means, and means carried by said frame for indicating the position of said first and second control means relative to the maximum path of travel of said ram assembly.

5. In a machine of the character described, a frame assembly, a ram assembly slidably supported in said frame assembly for lineal movement, reversible power means for reciprocating said ram assembly, first and second control means carried by said frame assembly for adjustment relative to one another lengthwise of the direction of movement of said ram assembly, a third control means carried by said ram assembly and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, and means actuated by engagement between said first and second control means and said third control means for reversing said power means.

6. In a machine of the character described, a frame assembly, a ram assembly, slidably supported in said frame assembly for lineal movement, reversible power means for reciprocating said ram assembly, first and second control means carried by said frame assembly for adjustment relative to one another lengthwise of the direction of movement of said ram assembly, a third control means carried by said ram assembly and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, means actuated by engagement between said first and second control means and said third control means for reversing said power means, and means carried by said frame for indicating the position of said first and second control means relative to the maximum path of travel of said ram assembly.

7. In a machine of the character described, a frame assembly, a ram assembly slidably supported in said frame assembly for lineal movement, reversible power means for reciprocating said ram assembly, first and second abutment means connected to one of said assemblies for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on one of said assemblies spaced from said first and second abutment means for individually adjusting said first and second abutment means, means operatively connecting said control means to said first and second abutment means, and means actuated by engagement between said first and second abutment means and said third abutment means for reversing said power means.

8. In a machine of the character described, a frame assembly, a ram assembly slidably supported in said frame assembly for lineal movement, reversible power means for reciprocating said ram assembly, first and second abutment means connected to said frame assembly for adjustment therealong lengthwise of the path of movement of said ram assembly, a third abutment means carried by said ram assembly and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, and means actuated by engagement between said first and second abutment means and said third abutment means for reversing said power means.

9. In a machine of the character described, a frame assembly, a ram assembly slidably supported in said frame assembly for lineal movement, reversible power means for reciprocating said ram assembly, first and second abutment means connected to said frame assembly for adjustment therealong lengthwise of the path of movement of said ram assembly, a third abutment means carried by said ram assembly and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, means actuated by engagement between said first and second abutment means and said third abutment means for reversing said power means, and means carried by said frame for indicating the position of said first and second abutment means relative to the maximum path of travel of said ram assembly.

10. In a machine of the character described, a frame assembly, a ram assembly slidably supported in said frame assembly for lineal movement, reversible power means for reciprocating said ram assembly, a member movably carried by one of said assemblies, first and second abutment means connected to said member for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, and means actuated by movement of said member for reversing said power means.

11. In a machine of the character described, a frame assembly, a ram assembly slidably supported in said frame assembly for lineal movement, reversible power means for reciprocating said ram assembly, a member movably carried by said frame assembly, first and second abutment means connected to said member for adjustment therealong lengthwise of the path of movement of said ram assembly, a third abutment means carried by said ram assembly and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, and means actuated by movement of said member for reversing said power means.

12. In a machine of the character described, a frame assembly, a ram assembly slidably supported in said frame assembly for lineal movement, reversible power means for reciprocating said ram assembly, first and second control means carried by one of said assemblies for adjustment relative to one another lengthwise of the direction of movement of said ram assembly, a third control means carried by the other of said assemblies and adapted to alternatively engage with said first and second control means as said ram assembly approaches predetermined positions in its path of movement, fourth control means on one of said assemblies spaced from said first and second control means for individually adjusting said first and second control means lengthwise of the direction of movement of said ram assembly, means operatively connecting said last named means to said first and second control means, means actuated by engagement between said first and second control means and said third control means for reversing said power means, and means interposed between said assemblies whereby energy is stored and returned to said ram assembly upon reversal thereof.

13. In a machine of the character described, a frame assembly, a ram assembly slidably supported in said frame assembly for lineal movement, reversible power means for reciprocating said ram assembly, first and second control means connected to said frame assembly for adjustment therealong lengthwise of the path of movement of said ram assembly, a third control means carried by said ram assembly and adapted to alternatively engage with said first and second control means as said ram assembly approaches predetermined positions in its path of movement, control means on said frame assembly spaced from said first and second control means for individually adjusting said first and second control means, means operatively connecting said last named means to said first and second control means, means actuated by engagement between said first and second control means and said third control means for reversing said power means, and means interposed between said assemblies whereby energy is stored and returned to said ram assembly upon reversal thereof.

14. In a machine of the character described, a frame assembly, a ram assembly slidably supported in said frame assembly for lineal movement, reversible power means for reciprocating said ram assembly, first and second abutment means carried by one of said assemblies for adjustment relative to one another lengthwise of the direction of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second abutment means lengthwise of the direction of movement of said ram assembly, means operatively connecting said control means to said first and second abutment means, means actuated by engagement between said first and second abutment means and said third abutment means for reversing said power means, and resilient means interposed between said abutment means and one of said assemblies whereby energy is stored and returned to said ram assembly upon reversal thereof.

15. In a machine of the character described, a frame assembly, a ram assembly slidably supported in said frame assembly for lineal movement, reversible power means for reciprocating said ram assembly, a member movably carried by one of said assemblies, first and second abutment means connected to said member for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, means actuated by movement of said member for reversing said power means, and resilient means interposed between said member and said assembly by which it is carried whereby energy is stored and returned to said ram assembly upon reversal thereof.

16. In a machine of the character described, a frame assembly, a ram assembly slidably supported in said frame assembly for lineal movement, reversible power means for reciprocating said ram assembly, a member movably carried by said frame assembly, first and second abutment means connected to said member for adjustment therealong lengthwise of the path of movement of said ram assembly, a third abutment means carried by said ram assembly and adapted to alternatively engage with said first and second abutment means as said ram assembly approaches predetermined positions in its path of movement, control means on said frame assembly spaced from said first and second abutment means for individually adjusting said first and second abutment means, means operatively connecting said control means to said first and second abutment means, means actuated by movement of said member for reversing said power means, and resilient means interposed between said member and said frame assembly whereby energy is stored and returned to said ram assembly upon reversal thereof.

17. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse slip clutch means for producing relative rotation between said screw and nut elements in opposite directions, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on one of said assemblies spaced from said first and second control means for individually adjusting said first and second control means lengthwise of the direction of movement of said ram assembly, means operatively connecting said last named means to said first and second control means, and means actuated by engagement between said first and second control means and said third control means for actuating said clutch means for reversing the direction of travel of said ram assembly.

18. In a machine of the character described, a frame assembly, a ram assembly slidably supported in said frame assembly for lineal movement, a screw element rotatably carried by said frame assembly, a nut element carried by said ram assembly and having threaded engagement with said screw element, power means comprising forward and reverse slip clutch means coaxial with said screw element for rotating said screw element relative to said nut element in opposite directions, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, and means actuated by engagement between said first and second control means and said third control means for selectively engaging said clutch means to rotate said screw element in opposite directions.

19. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse slip clutch means for producing relative rotation between said screw and nut elements in opposite directions, first and second abutment means connected to one of said assemblies for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means, for individually adjusting said first and second adjustment means, means operatively connecting said control means to said first and second abutment means, and means actuated by engagement between said first and second abutment means and said third abutment means for selectively operating said clutch means to reverse the direction of travel of said ram assembly.

20. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse slip clutch means for producing relative rotation between said screw and nut elements in opposite directions, a member movably carried by one of said assemblies, first and second abutment means connected to said member for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second adjustment means, means operatively connecting said control means to said first and second abutment means, and means actuated by movement of said member for selectively operating said clutch means.

21. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse pressure fluid operated friction clutch means for producing relative rotation between said screw and nut elements in opposite directions, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, and valve means actuated by engagement between said first and second control means and said third control means for actuating said clutch means for reversing the direction of travel of said ram assembly.

22. In a machine of the character described, a frame assembly, a ram assembly slidably supported in said frame assembly for lineal movement, a screw element rotatably carried by said frame assembly, a nut element carried by said ram assembly and having threaded engagement with said screw element, power means comprising forward and reverse pressure fluid operated friction clutch means coaxial with said screw element for rotating said screw element relative to said nut element in opposite directions, first and second control means carried by one of said assemblies for adjustment relative to one another lengthwise of the direction of movement of said ram assembly, a third control means carried by the other of said assemblies and adapted to alternatively engage said first and second control means as said ram assembly approaches predetermined positions in its path of movement, fourth control means on said frame assembly spaced from said first and second control means for individually adjusting said first and second control means lengthwise of the direction of movement of said ram assembly, means operatively connecting said last named means to said first and second control means, and valve means actuated by engagement between said first and second control means and said third control means for selectively engaging said clutch means to rotate said screw element in opposite directions.

23. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse slip clutch means for producing relative rotation between said screw and nut elements in opposite directions, a member movably carried by one of said assemblies, first and second abutment means connected to said member for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second adjustment means, means operatively connecting said control means to said first and second abutment means, means actuated by movement of said movable member for selectively operating said clutch means, and resilient means interposed between said movable member and the assembly by which it is carried whereby energy is stored and returned to said ram assembly upon reversal thereof.

24. In a machine of the character described, a frame assembly, a ram assembly slidably supported in said frame assembly for lineal movement, a screw element carried by one of said assemblies, a nut element carried by the other of said assemblies and having threaded engagement with said screw element, power means comprising forward and reverse pressure fluid actuated friction clutch means concentric with said screw element for producing relative rotation between said screw and nut elements in opposite directions, a member movably carried by one of said assemblies, first and second abutment means connected to said member for adjustment therealong lengthwise of the path of movement of said ram assembly, a third abutment means carried by the other of said assemblies and adapted to alternatively engage with said first and second abutment means as said ram assembly approaches predetermined positions in its path of movement, control means on said frame assembly spaced from said first and second abutment means for individually adjusting said first and second adjustment means, means operatively connecting said control means to said first and second abutment means, valve means actuated by movement of said movable member for selectively operating said clutch means, and resilient means interposed between said movable member and the assembly by which it is carried whereby energy is stored and reutrned to said ram assembly upon reversal thereof.

References Cited in the file of this patent

UNITED STATES PATENTS 665,966    Miles ------------------ Jan. 15, 1901

(Other references on following page)

UNITED STATES PATENTS

| | | |
|---|---|---|
| 685,347 | Richards | Oct. 29, 1901 |
| 986,123 | Atkinson | Mar. 7, 1911 |
| 1,008,593 | Fish | Nov. 14, 1911 |
| 1,057,023 | Whitney | Mar. 25, 1913 |
| 1,057,045 | Du Bois | Mar. 25, 1913 |
| 1,258,129 | McCann | Mar. 5, 1918 |
| 1,296,744 | Blood | Mar. 11, 1919 |
| 1,998,873 | Kingsbury | Apr. 23, 1935 |
| 2,063,899 | Wells | Dec. 15, 1936 |
| 2,176,666 | Cook | Oct. 17, 1939 |
| 2,383,357 | Walter | Aug. 21, 1945 |
| 2,413,299 | Ducker | Dec. 31, 1946 |
| 2,508,281 | Miller | May 16, 1950 |
| 2,528,736 | Bullard | Nov. 7, 1950 |
| 2,533,680 | Morey | Dec. 12, 1950 |
| 2,542,519 | Herrstrum | Feb. 20, 1951 |
| 2,588,676 | Walter | Mar. 11, 1952 |
| 2,599,388 | Hicks | June 3, 1952 |
| 2,661,629 | Andershock | Dec. 8, 1953 |
| 2,701,906 | Casey | Feb. 15, 1955 |
| 2,712,245 | Lee | July 5, 1955 |
| 2,728,242 | De Vlieg | Dec. 27, 1955 |
| 2,804,780 | Gerst | Sept. 3, 1957 |